US009811365B2

(12) United States Patent
Borthakur

(10) Patent No.: US 9,811,365 B2
(45) Date of Patent: Nov. 7, 2017

(54) MIGRATION OF APPLICATIONS BETWEEN AN ENTERPRISE-BASED NETWORK AND A MULTI-TENANT NETWORK

(71) Applicant: Amazon Technologies, Inc., Reno, NV (US)

(72) Inventor: Apolak Borthakur, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/274,426

(22) Filed: May 9, 2014

(65) Prior Publication Data

US 2015/0324215 A1    Nov. 12, 2015

(51) Int. Cl.
| G06F 9/455 | (2006.01) |
| G06F 15/173 | (2006.01) |
| G06F 9/445 | (2006.01) |
| H04L 12/26 | (2006.01) |
| G06F 9/50 | (2006.01) |

(52) U.S. Cl.
CPC ........ *G06F 9/45558* (2013.01); *G06F 9/5072* (2013.01); *G06F 9/5083* (2013.01); *H04L 43/0876* (2013.01); *G06F 2009/4557* (2013.01)

(58) Field of Classification Search
CPC .. G06F 9/45558; G06F 9/5072; G06F 9/5083; G06F 2009/4557; H04L 43/0876
USPC ..................... 718/1; 709/204–207, 223–226; 717/168–178
See application file for complete search history.

(56) References Cited

U.S. PATENT DOCUMENTS 7,484,208 B1 *  1/2009  Nelson ................ G06F 9/45558
                                                           711/6
7,730,486 B2 *  6/2010  Herington ............. G06F 9/5077
                                                           709/223

(Continued)

FOREIGN PATENT DOCUMENTS

WO    WO 2013/075640    5/2013

OTHER PUBLICATIONS

Voorsluys et al., "Cost of Virtual Machine Live Migration in Clouds: A Performance Evaluation," 2009, Springer-Verlag, p. 254-265.*

(Continued)

*Primary Examiner* — Qing Chen
(74) *Attorney, Agent, or Firm* — Klarquist Sparkman, LLP

(57) ABSTRACT

A method of migrating applications from an enterprise-based network to a multi-tenant network of a compute service provider may include receiving a request to migrate an application running on a first virtual machine instance within the enterprise-based network. Dependencies of the application may be determined by identifying at least a second virtual machine instance within the enterprise-based network, where the at least second virtual machine instance associated with the application. Resource monitoring metrics associated with hardware resources used by the first virtual machine instance and the at least second virtual machine instance may be received. The first and at least second virtual machine instances may be migrated from the enterprise-based network to at least one virtual machine at a server within the multi-tenant network based on the monitoring metrics, thereby migrating the application from the enterprise-based network to the multi-tenant network.

19 Claims, 11 Drawing Sheets

(56) References Cited

U.S. PATENT DOCUMENTS

| | | | | |
|---|---|---|---|---|
| 8,117,613 | B2* | 2/2012 | Uyeda | G06F 9/4856 718/1 |
| 8,413,147 | B2* | 4/2013 | Shen | G06F 9/45558 718/1 |
| 8,468,230 | B2* | 6/2013 | Murata | G06F 9/4856 709/223 |
| 8,489,699 | B2* | 7/2013 | Goggin | G06F 9/4856 709/213 |
| 8,619,779 | B2* | 12/2013 | Li | H04L 12/5695 370/392 |
| 8,694,644 | B2* | 4/2014 | Chen | G06F 9/4856 709/226 |
| 8,751,627 | B2* | 6/2014 | Liu | G06F 9/5088 709/223 |
| 8,850,430 | B2* | 9/2014 | Hayward | G06F 9/455 709/223 |
| 8,954,982 | B2* | 2/2015 | Da silva | G06F 9/5077 709/226 |
| 2006/0075080 | A1* | 4/2006 | Burr | H04L 29/12783 709/223 |
| 2006/0195715 | A1* | 8/2006 | Herington | G06F 9/5077 714/4.2 |
| 2008/0301801 | A1* | 12/2008 | Jothimani | H04L 12/4641 726/15 |
| 2009/0106409 | A1* | 4/2009 | Murata | G06F 9/5077 709/223 |
| 2010/0262974 | A1* | 10/2010 | Uyeda | G06F 9/4856 718/105 |
| 2010/0287263 | A1* | 11/2010 | Liu | G06F 9/5088 709/221 |
| 2010/0318609 | A1* | 12/2010 | Lahiri | G06F 9/5072 709/205 |
| 2011/0075674 | A1* | 3/2011 | Li | H04L 12/5695 370/401 |
| 2011/0099548 | A1* | 4/2011 | Shen | G06F 9/45558 718/1 |
| 2012/0054624 | A1* | 3/2012 | Owens, Jr. | H04L 41/22 715/735 |
| 2012/0096134 | A1* | 4/2012 | Suit | G06F 9/5072 709/221 |
| 2012/0180045 | A1* | 7/2012 | Bhogal | G06F 9/50 718/1 |
| 2012/0192182 | A1* | 7/2012 | Hayward | G06F 9/455 718/1 |
| 2012/0246638 | A1 | 9/2012 | He et al. | |
| 2013/0139154 | A1* | 5/2013 | Shah | G06F 9/45558 718/1 |
| 2013/0212578 | A1* | 8/2013 | Garg | H04L 43/0882 718/1 |
| 2013/0268643 | A1* | 10/2013 | Chang | G06F 9/45558 709/223 |
| 2013/0297769 | A1* | 11/2013 | Chang | G06F 9/45558 709/224 |
| 2014/0047440 | A1* | 2/2014 | Da Silva | G06F 9/5077 718/1 |
| 2014/0165063 | A1* | 6/2014 | Shiva | G06F 21/57 718/1 |
| 2014/0229608 | A1* | 8/2014 | Bauer | H04L 41/142 709/224 |
| 2015/0007172 | A1* | 1/2015 | Hudzia | G06F 9/45533 718/1 |
| 2015/0149999 | A1* | 5/2015 | Ramanathan | G06F 9/4856 718/1 |

OTHER PUBLICATIONS

Piao et al., "A Network-aware Virtual Machine Placement and Migration Approach in Cloud Computing," 2010, IEEE, p. 87-92.*
"Migrating Applications to Public Cloud Services: Roadmap for Success," Dec. 17, 2013, Cloud Standards Customer Council, p. 1-28.*
"vSphere Virtual Machine Administration: Updated 1," technical documentation copyright VMWare, Inc., 2009-2012, 242 pages.
International Search Report for International Application No. PCT/US2015/029514, 3 pages, dated Sep. 1, 2015.
Written Opinion for International Application No. PCT/US2015/029514, 5 pages, dated Sep. 1, 2015.

* cited by examiner

MIGRATION OF APPLICATIONS BETWEEN AN ENTERPRISE-BASED NETWORK AND A MULTI-TENANT NETWORK

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

An important consideration for private enterprise networks in connection with using the expanding cloud computing resources is the ease of moving (or migrating) applications from the private, enterprise-based network to the cloud computing environment. For example, the complexity of existing enterprise-based network applications may cause application migration tasks to be time-consuming, error-prone, and risky endeavors.

DETAILED DESCRIPTION

Figure 1:
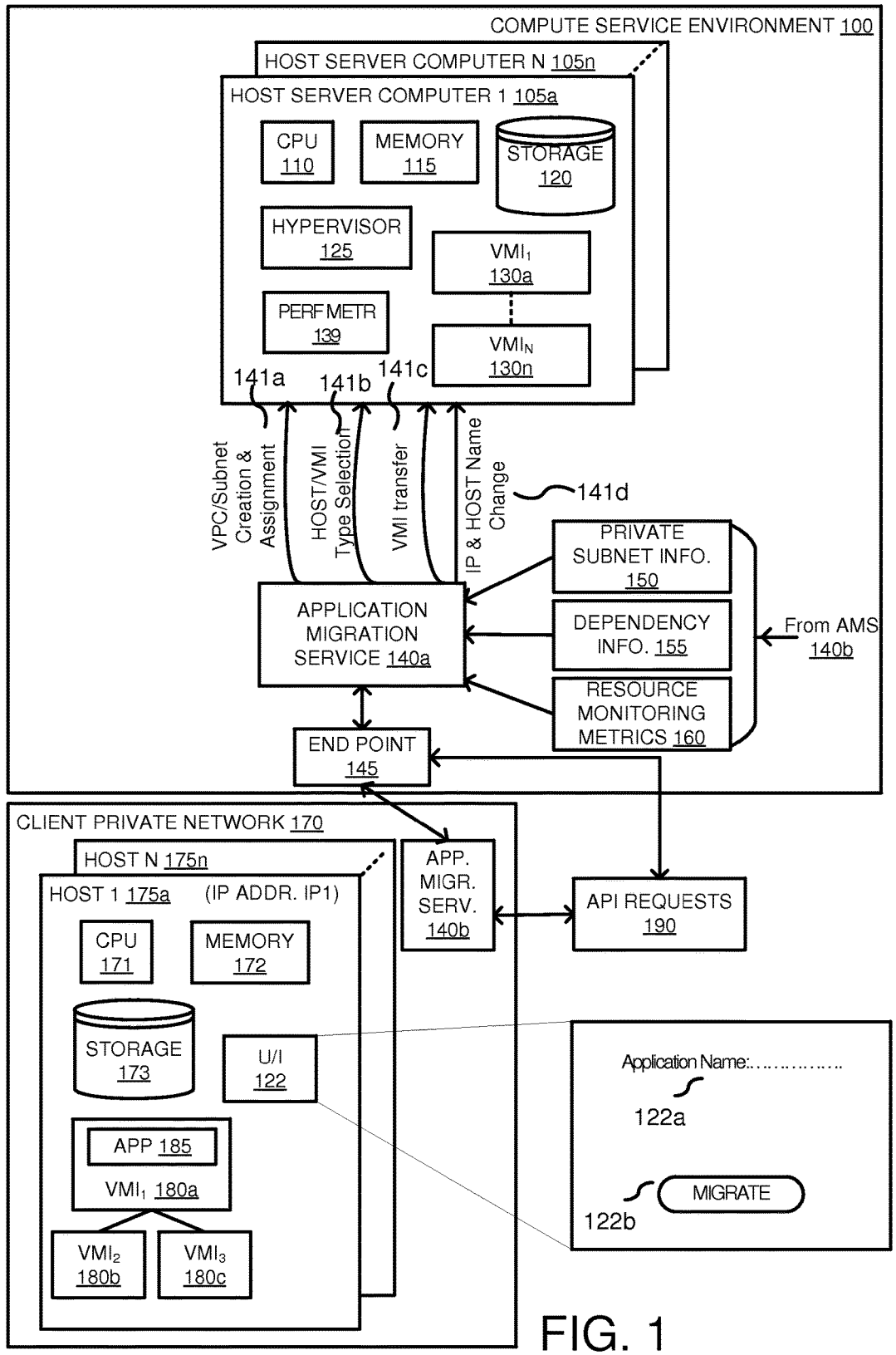
FIG. 1 is a network diagram illustrating migration of applications from an enterprise-based network to a compute service environment, in accordance with an example embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

As used herein, the terms "virtual machine" and "virtual machine instance" are interchangeable.

As used herein, the term "compute service provider" can refer to a cloud provider capable of delivering computing and storage capacity as a service to one or more end recipients. The compute service provider can be established for an organization by, or on behalf of, the organization (that is, the compute service provider may offer a "private cloud environment"). In other instances, the compute service provider can support a multi-tenant environment, where a plurality of customers operate independently (i.e., a public cloud environment). In this regard, the plurality of customers (e.g., multiple enterprises) can rent resources, such as server computers, within the multi-tenant environment.

As used herein, the term "enterprise-based network" (or "enterprise private network" or "enterprise network") can refer to the network of computer systems that are owned by an enterprise (e.g., a corporation or another business). Typically, information access within the enterprise-based network is limited to employees of the company. In that sense, the enterprise network is a single-tenant system. However, data can be available to external users through an enterprise portal, such as a web interface. Typically, server computers in the enterprise network are not rentable by third parties.

As used herein, the terms "moving" or "migrating" a virtual machine refer to moving a virtual machine from one server computer to another server computer. For example, a virtual machine is terminated, or otherwise suspended, from running at the current server computer, and is launched at another server computer. In this regard, one or more software packaging and distribution formats (e.g., Open Virtualization Format, or OVF) may be used for packaging and migrating the virtual machine to the new server computer.

As used herein, the term "resource monitoring metrics" may include actual use of computing resources by an application (or a virtual machine used to run the application). For example, computing resources may be associated with one or more server computers hosting the application (or the virtual machine), and may include use of CPU resources, memory resources, available storage resources, disk I/O utilization, and so forth. The monitoring of such metrics may be performed over a determined (e.g., fixed) period of time, and an average value (with or without standard deviation adjustment) may be generated. Alternatively, a snapshot of such metrics may also be generated, which may be indicative of resource usage at a certain point in time.

As used herein, the term "performance metrics" may include one or more metrics or characteristics associated with the architecture of a host server (or a virtual machine hosted by the server). For example, a host server architecture may be characterized by one or more of the following performance metrics: CPU speed, memory capacity, storage capacity, network card characteristics (e.g., speed), video card characteristics (e.g., resolution and video processing speed), disk I/O speed, and so forth.

FIG. 1 is a network diagram illustrating migration of applications from an enterprise-based network to a compute service environment, in accordance with an example embodiment of the disclosure. Referring to FIG. 1, the compute service environment 100 may be a compute service provider (i.e., a cloud provider), capable of delivery of computing and storage capacity as a service to a community of end recipients. Further details about the computer service environment/provider are disclosed herein in reference to FIGS. 4-6. The compute service environment 100 includes a plurality of host server computers 105a, . . . , 105n, an application migration service 140a, and an end point 145.

A host server computer (e.g., 105a) may comprise a CPU 110, memory 115, and storage 120. The host server 105a may be configured to execute a hypervisor 125 or another type of program configured to enable the execution of multiple virtual machine instances (VMIs) 130a, . . . , 130n.

Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

The compute service environment 100 includes an endpoint 145, which is a DNS address designed to receive and process API requests, such as API requests 190 from the application migration service 140a. Particular API requests of interest are the API request 190 associated with the private subnet information 150, dependency information 155, and resource monitoring metrics 160, as described below.

The application migration service 140a may comprise suitable circuitry, logic, and/or code and may be operable to migrate one or more applications (e.g., application 185) running on a remote server computer (e.g., host computer 175a within the client private network 170). The migration of the application may be based on one or more of, for example, the private subnet information 150, the dependency information 155, and the resource monitoring metrics 160, received from the application migration service 140b at the client private network 170.

The client private network 170 may be a remote client network, such as an enterprise-based network. The client network 170 may include a plurality of host server computers 175a, . . . , 175n. An example host server computer (e.g., 175a) may comprise a CPU 171, memory 172, and storage 173. The host servers (e.g., 175a) may be configured to run one or more VMIs, such as VMIs 180a-180c. One or more applications, such as application 185, may be running on a VMI (e.g., VMI 180a). The application 185 may be dependent on one or more additional VMIs (e.g., VMIs 180b-180c). For example, the application 185 may be installed on VMI 180a but additional functionalities (e.g., one or more databases or additional software modules) used by the application 185 may be installed on other VMIs (e.g., VMIs 180b-180c). In this regard, in instances when the application 185 is selected for migration (e.g., from the client private network 170 to the compute service provider 100), the VMI running the application 185 (i.e., VMI 180a) may be migrated together with any remaining VMIs that the application 185 depends on (or uses) (i.e., VMIs 180b-180c).

The client private network may also comprise an application migration service component 140b, which may be operable to provide one or more of the private subnet information 150, the dependency information 155, or the resource monitoring metrics 160 to the compute service environment 100. For example, the application migration service 140b may communicate directly with the application migration service 140a via the end point 145 (e.g., 140b may periodically initiate communication to report information such as 150, 155, or 160; alternatively, 140b may provide such information in response to an API request 190). The application migration service 140a and 140b may be, for example, software applications running on the operating system of a server computer within the compute service environment 100 and the client private network 170, respectively.

In operation, a user interface 122 may be activated (e.g., by a user) at the host computer 175a. The user interface 122 may include a text box 122a (or another interface) for receiving an input identifying an application to be migrated from the client private network 170 to the compute service environment 100. For example, the user may indicate the name of application 185 in the text box 122a, and then may initiate the migration process by hitting the "Migrate" button 122b (or by activating another type of user interface, such as screen tap, and so forth).

After receiving the name of application 185, the application migration service 140a in the compute service environment 100 may use one of the API requests 190 to obtain private subnet information 150, which may indicate if the host 175a and one or more of the VMIs 180a-180c are in a private sub-network (or subnet) of the client private network 170 (e.g., a virtual private cloud, a virtual local area network, and so forth). The application migration service 140a may then create a private network (e.g., a virtual private cloud) within the compute service environment 100 and assign a subnet for hosting the VMIs after migration (e.g., VPC/subnet creation and assignment 141a).

The application migration service 140a may obtain dependency information 155 from the application migration service 140b. The dependency information 155 may include information identifying the virtual machine the application 185 is running on (i.e., VMI 180a) as well as any other VMIs that the application 185 may use (or depend on) (i.e., VMIs 180b-180c). The application migration service 140a may then obtain resource monitoring metrics 160 from the application migration service 140b. The resource monitoring metrics 160 may be indicative of computing resource use by one or more of the application 185, the VMI running the application 185 (i.e., VMI 180a), as well as any of the VMIs the application 185 depends on (i.e., VMIs 180b-180c). For example, the resource monitoring metrics 160 may include CPU resources, memory resources, available storage resources, disk I/O utilization, and so forth, associated with the host computer 175a (since the host computer 175a is used to run the VMIs 180a-180c). In instances when one or more of the dependent VMIs 180b-180c are run from another one of the server computers 175a, . . . , 175n, then the resource monitoring metrics 160 will also indicate computing resource use for resources associated with that host computer as well. The resource monitoring metrics 160 may be collected by the CPU 171 or by a dedicated module (not illustrated) within the host computer 175a (or any of the remaining host computers 175a, . . . , 175n).

After obtaining the dependency information 155 and the resource monitoring metrics 160, the application migration service 140a may match one or more of the resource monitoring metrics 160 with performance metrics 139 of host server 105a (or any of the remaining host servers 105a, . . . , 105n) to select a virtual machine instance type (for migrating the VMIs 180a-180c) and a host server computer type within the compute service environment 100 to host the migrated VMIs (with the migrated application) from the client private network 170. The performance metrics 139 may include one or more of CPU speed, memory capacity, storage capacity, network card characteristics (e.g., speed), video card characteristics (e.g., resolution and video processing speed), disk I/O speed, and so forth, for the host server computer 105a (or any of the remaining host servers 105a, . . . , 105n).

In an example embodiment, the VMI 180a (running the application 185) and the dependent VMIs 180b-180c may all be hosted by host server computer 175a in the client private network 170. The resource monitoring metrics 160 may indicate the amount of computing resources of the host 175a used by the VMIs 180a-180c (e.g., VMIs 180a-180c may be using a total of 5 GB of disk space, 1 GB of RAM, 1.7 GHz CPU clock speed, etc.) After the virtual private cloud (VPC) and subnet creation and assignment (at 141a), the application migration service 140a may select a virtual machine instance type and a host server computer type (for launching the VMIs 108a-108c upon migrating the application 185) by matching the resource monitoring metrics 160 with the performance metrics 139 for one or more of the host server computers 105a, . . . , 105n. The VMI and host computer type selection is reflected as 141b in FIG. 1.

For example, the application migration service 140a may select a virtual machine instance type associated with 1 GB of RAM and 5 GB of disk space, and a host server computer type associated with CPU clock speed of 2 GHz, 1.5 GB RAM, and 7 GB disk space (e.g., host server computer 105a). In this regard, by matching the resource monitoring metrics 160 with the performance metrics 139, an efficient utilization of computing resources within the compute service environment 100 may be achieved, and a VMI and a host server computer type may be selected for migrating the application 185 and launching the VMIs identified by the dependency information 155 (i.e., VMIs 108a-180c) onto VMIs of the selected VMI type, which are hosted by a host computer of the selected host computer type.

In instances when the dependent VMIs 180b-180c (i.e., the VMIs the application 185 depends on, which are identified by the dependency information 155) are hosted by a different host computer (e.g., 175n) in the client private network 170, the resource monitoring metrics 160 may include use of computing resources associated with host server computer 175a as well as 175n. The application migration service 140a may then select VMI type and host server computer type for two host server computers (for launching VMI 180a on a first host server computer, and VMIs 180b-180c on the second host server computer) by matching the resource monitoring metrics 160 with the performance metrics 139 for one or more of the host server computers 105a, . . . , 105n.

The VMIs 180a-180c may then be migrated from the client private network 170 to the compute service environment 100. More specifically, at least one file packing format (e.g., OVF) may be used to package the VMIs 180a-180c, migrate them to the compute service environment 100, and launch them on the VMIs of the selected VMI type and hosted by a host server of the selected host server computer type as indicated by the host/VMI type selection 141b. The migrated VMIs 180a-180c may be transferred (i.e., VMI transfer 141c) and launched on the selected VMIs hosted by one or more of the selected host server computers. In this regard, the application migration service 140a may be operable to convert the migrating instance from a source format (e.g., format of the VMI compatible with the client private network 170) to a destination format (e.g., format of the VMI compatible with the compute service environment 100). During the conversion, the application migration service 140a may also install one or more drivers necessary for running the migrated VMIs in the destination format at the compute service environment 100.

In accordance with an example embodiment of the disclosure, the application migration service 140a may also obtain the name of the host server (or servers) hosting the VMIs 180a-180c, as well as the IP addresses associated with the hosting server (e.g., IP address IP1 for host server 175a) and/or the IP addresses of the VMIs 180a-180c. The application migration service 140a may then perform an IP and host name change 141d by changing the name and IP address of the host server (105a) hosting the migrated VMIs to the name and IP address of the previously hosting server (175a). Additionally, the IP and host name change 141d may change the IP addresses of the migrated VMIs to be the same as the IP addresses of the VMIs 180a-180c.

In accordance with another example embodiment of the disclosure, after the application migration service 140a performs matching of the resource monitoring metrics 160 with the performance metrics 139, the determined VMI type and server computer type for hosting the migrated application and VMIs may be communicated to the client private network 170 for confirmation or alternate selection. For example, the client private network 170 may use a user interface (such as 122) to display the automatic selection of the VMI type and the host server computer type performed by the compute service environment 100. A user at the client private network 170 may then confirm such automatic selection, or may specify an alternate selection of a different VMI type and a server computer type for use in launching the migrated application 185 and VMIs 180a-180c.

Figure 2A:
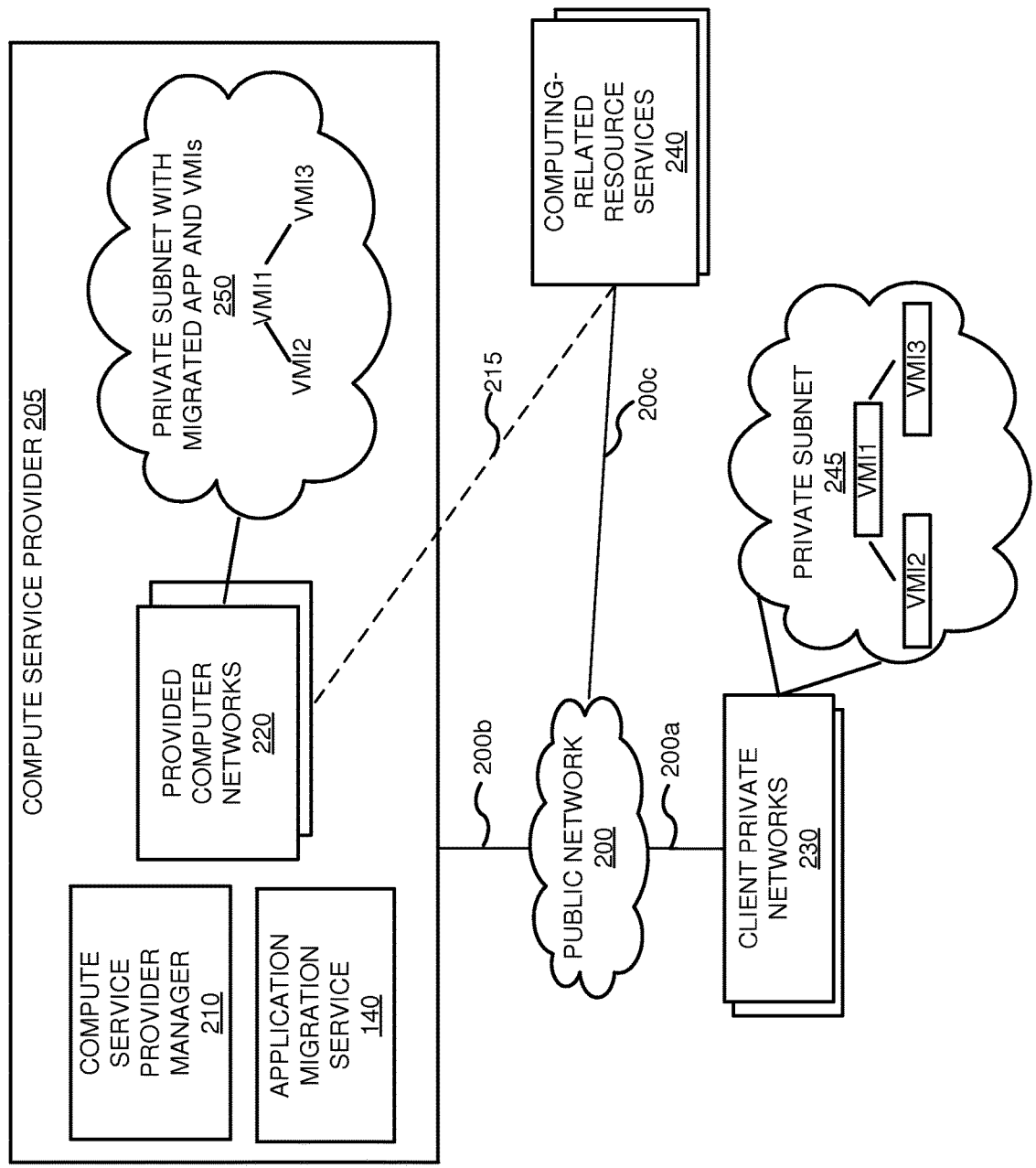
FIGS. 2A and 2B are network diagrams illustrating example embodiments of interactions that involve remote clients creating and configuring private computer networks that support migration of applications.
Figure 2B:
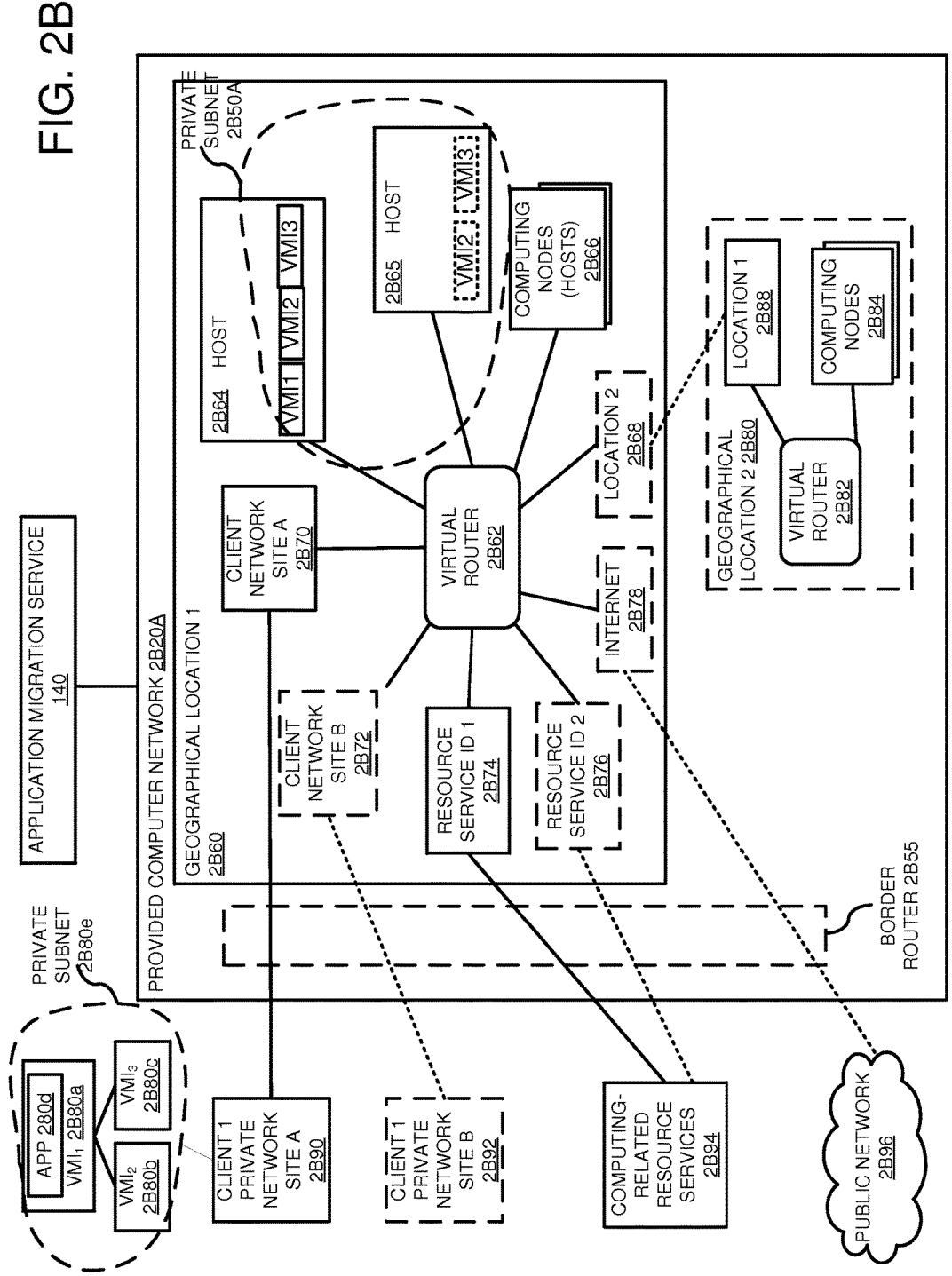

FIGS. 2A and 2B are network diagrams illustrating example embodiments of interactions that involve remote clients creating and configuring private computer networks that support migration of applications. FIG. 2A is a network diagram illustrating an example embodiment of a Compute Service Provider 205 that enables remote clients to create and configure computer networks for use by the clients. In this example, the computer networks that are created and configured are private network extensions to existing private computer networks of clients, and a Compute Service Provider 205 provides such functionality to clients (not shown) over one or more public networks 200 (e.g., over the Internet). Thus, the remote clients may use the Compute Service Provider ("CSP") 205 to dynamically modify the size and/or capabilities of their private computer networks, such as by using cloud computing techniques over the public networks 200.

In particular, in the example of FIG. 2A, a number of clients (not shown) are interacting over a public network 200 with a CSP Manager module 210 to create and configure various private computer network extensions 220 to remote existing client private networks 230, with at least some of the computer network extensions 220 being configured to enable secure private access from one or more corresponding client private networks 230 over the public network 200 (e.g., via VPN connections established over interconnections 200a and 200b). In this example embodiment, the Manager module 210 assists in providing functionality of the CSP 205 to the remote clients, such as in conjunction with various other modules (not shown) of the CSP 205 and various computing nodes and networking devices (not shown) that are used by the CSP 205 to provide the private computer network extensions 220. In at least some embodiments, the CSP Manager module 210 may execute on one or more computing systems (not shown) of the CSP 205, and may provide one or more APIs that enable remote computing systems to programmatically interact with the module 210 to access some or all functionality of the CSP 205 on behalf of clients (e.g., to create, configure, and/or initiate use of private network extensions 220). In addition, in at least some embodiments, clients may instead manually interact with the module 210 (e.g., via a user interface provided by the module 210) to perform some or all such actions. The CSP 205 may also include an application migration service 140a, with functionalities as described in reference to FIG. 1.

The public network 200 may be, for example, a publicly accessible network of linked networks, possibly operated by distinct parties, such as the Internet. The remote client private networks 230 may each include one or more existing private networks, such as a corporate or other private network (e.g., home, university, etc.) that is partially or wholly inaccessible to non-privileged users, and that includes computing systems and/or other networked devices of a client. In an example embodiment, the client private networks 230 may include a VMI running an application (e.g., VMI1, which is similar to VMI 180 in FIG. 1) as well as VMIs (e.g., VMI2 and VMI3, which the application running on VMI1 depends on). The VMIs VMI1-VMI3 may be connected in a private subnet 245 (e.g., a host server computer running VMI1-VMI3 may be connected in the subnet 245).

In the illustrated example, the provided network extensions 220 each include multiple computing nodes (not shown), at least some of which are provided by or otherwise under the control of the CSP 205, and each of the provided network extensions 220 may be configured in various ways by the clients for whom they are provided. Each of the network extensions 220 in the illustrated embodiment may be a private computer network that is accessible only by the client that creates it, although in other embodiments at least some computer networks provided by the CSP 205 for clients may be publicly accessible and/or may be standalone computer networks that are not extensions to other existing computer networks. Similarly, while the provided computer networks 220 in the example are extensions to remote client computer networks 230 that are private networks, in other embodiments the provided computer networks 220 may be extensions to client computer networks 230 that are not private networks.

In accordance with an example embodiment of the disclosure, the application migration service 140a may migrate an application, the VMI it is running on (e.g., VMI1) and any dependent VMIs (e.g., VMI2-VMI3) from the client private networks 230 to one or more server computers within the provided computer networks 220 (similarly to the application migration functionalities described in reference to FIG. 1). Additionally, the migrated VMI1-VMI3 may be connected in a private subnet 250 within the compute service provider 205, as illustrated in FIG. 2A.

Private access between a remote client private computer network 230 and corresponding private computer network extension 220 provided for a client may be enabled in various ways, such as by establishing a VPN connection or other secure connection between them that allows intercommunication over the public network 200 in a secure private manner. For example, the CSP 205 may automatically perform appropriate configuration on its computing nodes and other computing systems to enable VPN access to a particular private network extension 220 of a client, such as by automatically configuring one or more VPN mechanisms hosted by the CSP 205 (e.g., software and/or hardware VPN mechanisms), and/or may automatically provide appropriate configuration information to the client (e.g., credentials, access points, and/or other parameters) to allow a VPN mechanism hosted on the remote client private network 230 to establish the VPN access. After VPN access has been appropriately enabled and/or configured, a VPN connection may be established between the remote client private network and the private network extension, such as initiated by the client using IPsec ("Internet Protocol Security") or other appropriate communication technologies. For example, in some embodiments, a VPN connection or other secure connection may be established to or between networks that use MPLS ("Multi Protocol Label Switching") for data transmission, such as instead of an IPsec-based VPN connection.

In addition, in the illustrated embodiment, various network-accessible remote resource services 240 are available to remote computing systems over the public network 200, including to computing systems on the remote client private networks 230. The resource services 240 may provide various functionality to the remote computing systems, such as for at least some of the resource services 240 to provide remote computing systems with access to various types of computing-related resources. Furthermore, at least some of the private network extensions 220 that are provided by the CSP 205 may be configured to provide private or other specialized access to at least some of the remote resource services 240, with that provided access optionally appearing to computing nodes of the private network extensions 220 as being locally provided via virtual connections 215 that are part of the private network extensions 220, although the actual communications with the remote resource services 240 may occur over the public networks 200 (e.g., via interconnections 200b and 200c). Additional details regarding establishing and using such private or other specialized access to remote resource services are discussed in greater detail elsewhere.

As previously noted, the provided network extensions 220 may each be configured by clients in various manners. For example, in at least some embodiments, the CSP 205 provides multiple computing nodes that are available for use with network extensions provided to clients, such that each provided network extension 220 may include a client-configured quantity of multiple such computing nodes that are dedicated for use as part of the provided network extension. In particular, a client may interact with the module 210 to configure a quantity of computing nodes to initially be included in a computer network provided for the client (e.g., via one or more programmatic interactions with an API provided by the CSP 205). In addition, in at least some such embodiments, computing nodes may later be dynamically added to or removed from a provided computer network of a client (e.g., via one or more programmatic interactions with an API provided by the CSP 205), such as after the provided computer network has already been in use by the client (e.g., by indicating to initiate or terminate execution of particular programs on particular computing nodes). Furthermore, the CSP 205 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client.

In addition, in at least some embodiments, a client may interact with the module 210 to configure network addresses for a computer network provided for the client (e.g., via one or more programmatic interactions with an API provided by the CSP 205), and network addresses may later be dynamically added, removed or modified for a provided computer network of a client in at least some such embodiments, such as after the provided computer network has already been in use by the client. For example, if a particular provided computer network that is being configured is an extension to an existing remote client computer network, the client may specify one or more address ranges (e.g., a Classless Inter-Domain Routing ("CIDR") address block) or other groups of network addresses that are a subset of the network addresses used by the existing remote client computer network, such that the specified network addresses are used for the computing nodes of the provided computer network. Such configured network addresses may in some situations be virtual or private network addresses that are not directly addressable from computing systems on the public network 200 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 200 (e.g., a public network address that is a static Internet-routable IP address or other non-changing network address).

In other embodiments, the CSP 205 may automatically select network addresses to be used for at least some computing nodes of at least some provided computer network extensions, such as based on network addresses that are available for use by the CSP 205, based on selecting network addresses that are related network addresses used by remote existing computer networks corresponding to the provided computer networks, etc. In addition, in at least some embodiments in which the CSP 205 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CSP 205 manages the network addresses distinctly for each client, such that a first client may have a first computing node associated with a particular specified network address for the first client's provided computer network, while a distinct second client may have a distinct second computing node associated with the same particular specified network address for the second client's provided computer network.

Once network addresses are configured or otherwise determined for a provided computer network, the CSP 205 may assign the network addresses to various of the computing nodes selected for the provided computer network, such as in a random manner, by using DHCP ("Dynamic Host Configuration Protocol") or other techniques for dynamic assignment of network addresses, etc. In addition, even if public network addresses are used for a particular computer network, the CSP 205 may map one or more of those public network addresses for use in other manners, such as to use a particular public network address to act as an access mechanism for a particular remote resource service as described in greater detail elsewhere, so that communications sent to that particular public network address by computing nodes of that particular computer network will be forwarded to the corresponding remote resource service rather than to another computing system on the Internet or other network to which that particular public network address is assigned. FIG. 2B provides additional details regarding an example of using configured network addresses to route communications within a provided computer network.

In addition, in at least some embodiments, a client may interact with the module 210 to configure network topology information for a computer network provided for the client (e.g., via one or more programmatic interactions with an API provided by the CSP 205), and such network topology information may later be dynamically modified for a provided computer network in at least some such embodiments, such as after the provided computer network has already been in use by the client. For example, a client may specify particular types of networking devices (e.g., routers, switches, etc.) and/or other network devices or nodes (e.g., firewalls, proxies, network storage devices, printers, etc.) to be part of the provided computer network, and/or may specify subsets of the computing nodes of the provided computer network to be grouped together or that are to otherwise share common intercommunication characteristics (e.g., a particular subset of computing nodes that are part of a subnet for which intercommunications are not filtered and/or that are associated with a particular networking device).

In addition, the specified configuration information for a provided computer network may in at least some embodiments include routing information or other interconnectivity information between networking devices and/or groups of computing devices. Furthermore, in at least some embodiments, the CSP 205 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CSP 205 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; etc.).

As discussed in greater detail elsewhere, in at least some embodiments, the interconnections and intercommunications between computing nodes of a provided computer network are managed using an underlying substrate network of the CSP 205, and if so, some or all of the configured network topology information may be simulated in at least some such embodiments using the underlying substrate network and corresponding modules of the CSP 205. For example, each of the computing nodes provided by the CSP 205 may be associated with a node communication manager module of the CSP 205 that manages communications to and from its associated computing nodes. If so, firewall devices may be simulated by using the associated communication manager module for a computing node to disallow or otherwise handle communications to and/or from the computing node in a manner consistent with one or more simulated firewall devices. Such node communication manager modules may similarly simulate routers and subnets by controlling how and whether intercommunications are passed between computing nodes, and by responding to requests from computing nodes for information (e.g., ARP, or address resolution protocol, requests) with appropriate response information. One or more external communication manager modules of the CSP 205 may manage communications between the computing nodes provided by the CSP 205 and external computing systems, such as to similarly simulate firewall devices and enforce specified network access constraints, as well as to manage configured access mechanisms for remote resource services and secure connections to remote client private computer networks. Other types of network topology information may be similarly simulated, and additional details regarding the use of various modules of the CSP 205 in some embodiments are discussed below with respect to FIG. 3.

In addition, in at least some embodiments, a client may interact with the module 210 to configure various network access constraint information for a computer network provided for the client (e.g., via one or more programmatic interactions with an API provided by the CSP 205), and such network access constraint information may later be dynamically modified for a provided computer network in at least some such embodiments, such as after the provided computer network has already been in use by the client. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which private or other specialized access has been established, external to the provided computer network and any corresponding remote client computer network, etc.); types of other computing systems; etc. In addition, as discussed in greater detail elsewhere, in at least some embodiments a provided computer network may be configured to provide private or other specialized access to one or more remote resource services, such as via a configured access mechanism that is part of or otherwise local to the provided computer network. In a manner similar to that for network topology information and other routing information, the CSP 205 may enforce network access constraint information for provided computer networks in various manners. Additional details related to managing communications for provided computer networks in some embodiments are discussed below with respect to FIG. 3.

Figure 3:
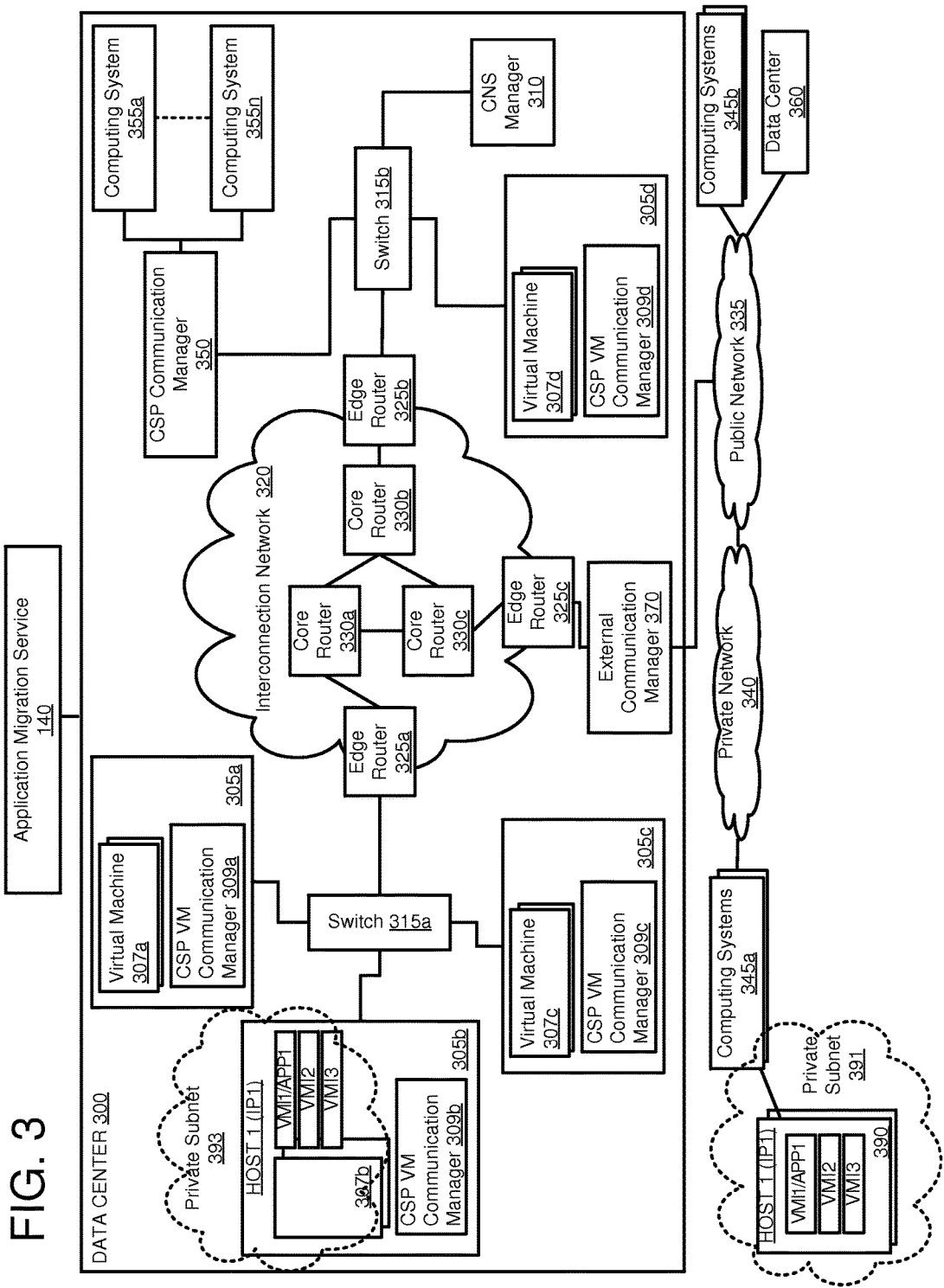
FIG. 3 is a network diagram illustrating an example embodiment of interconnected computing systems for use in providing computer networks supporting application migration to clients.

FIG. 2B illustrates additional details regarding an example computer network 220A that may be provided by the CSP 205 (or other embodiment of a compute service provider) for a client, with the provided computer network 220A in this example being a private network extension to a remote private computer network of the client, such as one of the remote private computer networks 230 of FIG. 2A. In this example, various connections and communication paths for the provided computer network 220A are shown in a conceptual manner to illustrate types of configurable network access constraints and network topology, and FIG. 3 illustrates additional details regarding an example of underlying substrate networks and connections that may be used to create provided computer networks such as the example provided computer network 220A.

In particular, in FIG. 2B, the provided computer network 220A includes various computing nodes (or host server computers) provided by the CSP 205 that are located at a first geographical location 1 260 (e.g., at a first data center at the geographical location 1), with the various computing nodes being configured into logical groups 264, 265 and 266 in this example (e.g., to correspond to different subnets and/or associated configured networking devices, not shown). In this example, a single conceptual virtual router 262 is shown at geographical location 1 to control communications between those computing nodes and other computing systems, so as to illustrate different types of communications that may occur, although the provided computer network 220A may actually have multiple or no configured networking devices at geographical location 1, and the computer network 220A may be implemented by the configurable network service at the geographical location 1 in various manners, such as via multiple physical interconnected routers or other networking devices, by using an underlying substrate network and associated modules that control communications over the underlying substrate network, etc. In this example, the virtual router 262 operates in accordance with the configured information for the provided computer network 220A, including configured network topology information, configured private or other specialized access to remote resource services, and other configured network access constraint information, such as to route communications that are sent to network addresses within the provided computer network 220A to corresponding destination computing nodes on the provided computer network 220A, and to route other communications to other network addresses outside of the provided computer network 220A as appropriate. Furthermore, communications that are not permitted by configured firewall devices, configured network topology information, or other configured network access constraints may be blocked or otherwise managed by the virtual router 262.

In this example, the computer network 220A is provided for an example Client 1, and is a network extension to a remote computer network of Client 1. Client 1's remote computer network includes multiple computing systems (not shown) at a first remote location Site A 290, and the virtual router 262 is configured to communicate with those multiple computing systems via a virtual communication link 270 at the geographical location 1. For example, the provided computer network 220A may include one or more configured VPN connections to the multiple computing systems at Site A 290, and the communication link 270 may correspond to one or more such VPN connections. In addition, the remote computer network of Client 1 may optionally include computing systems at one or more other locations, such as the illustrated optional Site B 292, and if so the virtual router 262 may further be configured to communicate with those other computing systems at the other locations, such as via an optional virtual communication link 272 to Site B 292 (e.g., via one or more other configured VPN connections directly to Site B).

When multiple VPN connections or other secure connections are used to remote computing systems of a remote computer network, each connection may correspond to a subset of the remote computing systems (e.g., by being associated with a subset of the network addresses of the remote computer network that correspond to those remote computing systems), so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Furthermore, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the provided computer network 220A may be configured to allow all, some or no communications between the computing nodes of the provided computer network 220A and other external computing systems that are generally accessible on the Internet 296 or other public networks. If at least some such external communications are allowed, the virtual router 262 may further be configured to communicate with those external multiple computing systems via an optional virtual communication link 278 of the provided computer network 220A, such as in conjunction with an optional virtual border router 255 for the provided computer network 220A. The virtual border router 255 may be physically implemented in various manners, such as by the CSP 205 using one or more actual firewall devices or border router devices that manage communications between external computing systems and the various computing nodes provided by the CSP 205 at geographical location 1 (e.g., actual devices that support numerous computer networks provided by the CSP 205 to clients that use those computing nodes of the CSP 205), by using an underlying substrate network and associated modules that control communications over the underlying substrate network (e.g., to prevent disallowed communications from being sent by computing nodes of the provided computer network 220a onto the substrate network), etc. Furthermore, the virtual border router 255 may further conceptually assist in managing other communications to other computing systems external to the provided computer network 220A, such as to the remote client computer network at Sites A and B, to one or more remote resource services, etc.

In addition, the provided computer network 220A may be configured to provide private or other specialized access to one or more remote resource services, such as by assigning one or more network addresses of the provided computer network 220A to represent those one or more remote resource services, and by optionally configuring particular actions to be taken for communications sent to those assigned network addresses. In this example, the virtual router 262 has been configured to provide local access to remote resource service 294 via a virtual communication link 274 of the provided computer network 220a. Thus, for example, if one of the computing nodes of the provided computer network 220a sends a communication to a particular network address of the provided computer network 220a that is mapped to the communication link 274, the virtual router may forward that communication to the remote resource service 294 external to the provided computer network 220a (e.g., via the Internet or other public networks). In other embodiments, the remote resource service 294 may implement an interface that is part of the CSP 205 or otherwise at the geographical location 1, and if so the communications sent to the particular network address of the provided computer network 220A that is mapped to the communication link 274 may instead be forwarded to that interface of the remote resource service for handling.

In addition, the virtual communication link 274 may be configured in at least some embodiments to manage communications sent via the link in various manners, such as to modify those communications in one or more manners before they are forwarded to the remote resource service 294, or to otherwise access the remote resource service 294 in a specialized manner. For example, in the illustrated embodiment, the virtual communication link 274 may be configured to correspond to a particular namespace within the remote resource service 294, with a subset of the computing-related resources provided by the remote resource service 294 being part of that namespace. Accordingly, the virtual communication link 274 may be configured to access resources within the particular namespace, such as by modifying or translating communications to use a name or other identifier associated with the particular namespace, by using a particular interface of the remote resource service that supports indicating a particular namespace, etc.

In addition, if the virtual communication link 274 is configured to correspond to a particular namespace or to otherwise correspond to a subset of the resources provided by the remote resource service 294, the provided computer network 220A may optionally be further configured to include one or more other virtual communication links that also correspond to the same remote resource service 294 but are configured to access the remote resource service 294 in other manners. For example, the provided computer network 220A may optionally include a distinct virtual communication link 276 that is configured to access the remote resource service 294 in a distinct manner than that of virtual communication link 274, such as to correspond to a distinct second namespace, to not correspond to any particular namespace, to use an identifier of a customer of the remote resource service 294 that is distinct from a customer identifier used for communication link 274, etc. In this example, the virtual communication links 274 and 276 are configured to use different identifiers (e.g., different namespace identifiers), which are represented in this example as ID 1 and ID 2 for the links 274 and 276, respectively. Thus, the computing nodes of the provided computer network 220a may be able to access different types of functionality from remote resource 294. Furthermore, while not illustrated here, the provided computer network 220A may be similarly configured to access one or more other remote resource services (not shown) using other virtual communication links to those other remote resource services.

In addition to or instead of configuring the virtual communication link 274 to access a particular namespace of the remote resource service 294, the virtual communication link may be configured in at least some embodiments to provide additional information to the remote resource service 294 to allow the remote resource service 294 to validate the location or other source of the communications as being the provided computer network 220a. For example, in the illustrated embodiment, the virtual communication link 274 may be configured to correspond to one or more particular identifiers or other access control indicators that are associated with the provided computer network 220a by the compute service provider or by the remote resource service 294, so that a subset of new and/or existing computing-related resources provided by the remote resource service 294 that are accessed via the virtual communication link 274 are associated with the access control indicator(s), for use by the remote resource service 294 in restricting access to those resources.

Accordingly, the virtual communication link 274 may be configured to use the specified additional indicator(s) associated with the provided computer network 220a in various manners, such as to modify communications to include the additional indicator(s), to send the additional indicator(s) along with the communications without modification of the communications, to use a particular interface of the remote resource service that supports including such additional indicator(s), etc. In addition, if the virtual communication link 274 is configured to correspond to one or more additional indicators, the provided computer network 220A may optionally be further configured to include one or more other virtual communication links that also correspond to the same remote resource service 294 but are configured to access the remote resource service 294 in other manners. For example, the provided computer network 220A may optionally configure the distinct virtual communication link 276 to access the remote resource service 294 without using any additional indicators (e.g., to provide the same access to the remote resource service 294 as would otherwise be publicly available), to use one or more other additional access control indicators that are distinct from those used with virtual communication link 274, to use an identifier of a customer of the remote resource service 294 that is distinct from a customer identifier used for virtual communication link 274, etc. Furthermore, while not illustrated here, the provided computer network 220a may be similarly configured to access one or more other remote resource services (not shown) using other virtual communication links to those other remote resource services, such as other virtual communication links that are configured to use the same one or more additional indicators as virtual communication link 274, or that are otherwise configured.

In accordance with an example embodiment of the disclosure, an application 280d may be running on a VMI 280a hosted by a host server of the client private network site A 290. The application 280d may also utilize (i.e., may depend on) functionalities provided by VMIs 280b-280c. Additionally, the provided computer network 220A may use an application migration service 140a, which provides functionalities as described in reference to FIG. 1. For example, the application migration service 140a may be used to migrate the application 280d to a host server 264 within the provided network 220A. More specifically, the VMIs 280a-280c may be migrated, as explained in reference to FIG. 1, and launched as VMI1, VMI2, and VMI3, respectively, at the host computer 264. In instances when, for example, VMIs 280b-280c and VMI 280a are hosted by two different server computers, then upon migrating all VMIs, VMIs 280b-280c may be launched as VMI2-VMI3 at a different server (e.g., host server 265) at the provided computer network 220A. Furthermore, since the original VMIs 280a-280c were in a private subnet 280e, upon migration, the new VMIs VMI1-VMI3 may also be placed in a private subnet 250A.

In the illustrated embodiment, in addition to the computing nodes of the CSP 205 at geographical location 1, the provided computer network 220A may further include computing nodes 284 provided by the CSP 205 that are located at a second geographical location 2 280 (e.g., at a distinct second data center at the geographical location 2). Accordingly, the virtual router 262 may be configured to include an optional virtual communication link 268 to the portion of the provided computer network 220a at the geographical location 2. In this example, the portion of the provided computer network 220A at the geographical location 2 similarly is illustrated with a conceptual virtual router 282 to manage communications to and from the computing nodes 284, including to communicate with the portion of the provided computer network 220A at the geographical location 1 via a virtual communication link 288. Such communications between computing nodes of the CSP 205 at different geographical locations may be handled in various manners in various embodiments, such as by sending the communications over the Internet or other public networks (e.g., as part of a secure tunnel, such as that uses encryption supported by the CSP 205), by sending the communications in a private secure manner (e.g., via a dedicated lease line between the geographical locations), etc. In addition, while not illustrated here, the portion of the provided computer network 220A at the geographical location 2 may similarly include some or all of the same types of other virtual communication links illustrated for the portion at geographical location 1, such as to a remote client private network (e.g., via one or more VPN connections distinct from any VPN connections to the geographical location 1), to remote resource services, to the Internet, etc.

It will be appreciated that the example provided computer network 220A of FIG. 2B is included for exemplary purposes, and that other computer networks provided by the CSP 205 for clients may not include all of the types of configured communications links and network topology information, and/or may include other types of configured communications links and network topology information that is not illustrated here. For example, in some embodiments and situations, a provided computer network may include configured devices and other resources in addition to or instead of computing nodes, and if so, each such other resource may optionally be assigned a network address of the provided computer network. Furthermore, the conceptual devices and communication links illustrated in FIG. 2B may be implemented using a variety of types of underlying physical devices, connections and modules. In addition, while not illustrated here, clients may perform a variety of other types of interactions with remote resource services, whether from provided computer networks or instead other remote computing systems, such as to subscribe/register to use resource, receive/create various credentials (e.g., user IDs, passwords, etc.), create resources and/or namespaces from other remote computing systems (e.g., that are part of a remote private corporate network) that are later accessed from a provided computer network (e.g., a network extension to the private corporate network), etc.

FIG. 3 is a network diagram illustrating an example embodiment of computing systems for use in providing computer networks, such as by an embodiment of a compute service provider. In particular, in this example, a number of physical computing systems are co-located in a data center 300 and are interconnected via various networking devices and one or more physical networks. The physical computing systems and other devices are used in this example by a compute service provider to provide multiple computer networks for clients, by establishing and maintaining each of the provided computer networks as a virtual network, and by using the physical network(s) as a substrate network on which the virtual networks are overlaid. For example, with respect to the example of FIG. 2B, the data center 300 may be located at geographical location 1, and the illustrated physical computing systems may be used to provide the computing nodes 264, 265 and 266 of provided computer network 220A. The use of the overlay networks and underlying substrate network may be transparent to the computing nodes of the provided computer networks in at least some embodiments.

Thus, in this example, the computer networks provided by the compute service provider are implemented as virtual overlay networks that send communications via an underlying physical substrate network. The provided virtual overlay networks may be implemented in various ways in various embodiments, such as without encapsulating communications in some embodiments (e.g., by embedding virtual network address information for a virtual network in communications configured for a networking protocol of the physical substrate network). As one illustrative example, a virtual network may be implemented using 32-bit 1Pv4 ("Internet Protocol version 4") network addresses, and those 32-bit virtual network addresses may be embedded as part of 128-bit 1Pv6 ("Internet Protocol version 6") network addresses used by the physical substrate network, such as by re-headering communication packets or other data transmissions (e.g., using Stateless IP/ICMP Translation, or SIIT), or otherwise modifying such data transmissions to translate them from a first networking protocol for which they are configured to a distinct second networking protocol.

As another illustrative example, both the virtual network and substrate network may be implemented using the same network addressing protocol (e.g., 1Pv4 or 1Pv6), and data transmissions sent via the provided virtual overlay network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay networks may be implemented using encapsulation of communications.

The illustrated example of FIG. 3 includes a data center 300 with multiple physical computing systems operated by an embodiment of the compute service provider. The data center 300 is connected to one or more public networks 335 external to the data center 300, which provide access to one or more remote computing systems 345a via private network 340, to one or more other globally accessible data centers 360 that each have multiple computing systems at other geographical locations, and to one or more other remote computing systems 345b. The public network 335 may be, for example, a publicly accessible network of networks, possibly operated by various distinct parties, such as the Internet, and the private network 340 may be, for example, a corporate network that is wholly or partially inaccessible from computing systems external to the private network 340. Computing systems 345b may each be, for example, a home computing system that connects directly to the Internet (e.g., via a telephone line, cable modem, a Digital Subscriber Line ("DSL"), etc.).

In this example, the configuring of the virtual provided computer networks is facilitated by a manager module 310 of the compute service provider, and multiple other modules of the compute service provider are used to implement functionality of the provided computer networks, such as from the edge of the physical substrate network by modifying communications that enter and/or leave the substrate network. In particular, in this example, multiple node communication manager modules of the compute service provider each manage communications to and from associated computing nodes, such as the illustrated node communication manager modules 309a, 309d and 350. In addition, in this example, an external communication manager module 370 of the compute service provider manages communications between the physical computing systems within the data center 300 and external computing systems, as discussed in greater detail below. While only a single external communication manager module 370 is illustrated in this example, it will be appreciated that the functionality of the module 370 may be implemented using multiple devices, such as for redundancy and load balancing.

The data center 300 includes a number of physical computing systems (e.g., host server computers running one or more virtual machine instances) 305a-305d and 355a-355n, as well as a CSP node communication manager module 350 that executes on one or more other computing systems (not shown) to manage communications for the associated computing systems 355a-355n, and a manager module 310 of the compute service provider that executes on one or more computing systems (not shown). In this example embodiment, each physical computing system 305a-305d hosts multiple virtual machine computing nodes and also includes a virtual machine ("VM") node communication manager module (e.g., as part of a virtual machine hypervisor monitor for the physical computing system), such as the CSP VM node communication manager module 309a and virtual machines 307a on computing system 305a, and such as CSP VM node communication manager module 309d and virtual machines 307d on computing system 305d. Each of the virtual machine computing nodes may be used by the compute service provider as a distinct computing node of a computer network provided for a client. Physical computing systems 355a-355n do not execute any virtual machines in this example, and thus may each act as a distinct computing node that is part of a computer network provided for a client by the compute service provider. In other embodiments, all or none of the physical computing systems at the data center may host virtual machines.

For example, the remote computing system 345a may be part of an enterprise-based network. An application APP1 may be running on VMI1 hosted by a host server 390 of the remote computing system 345a of the enterprise-based network. The application APP1 may also utilize (i.e., may depend on) functionalities provided by VMI2 and VMI3 also hosted by the same host server 390. The data center 300 of a compute service provider (e.g., a public cloud network) may use an application migration service 140a, which provides functionalities as described in reference to FIG. 1. For example, the application migration service 140a may be used to migrate the application APP1 to a host server 305b within the data center 300. More specifically, VMI1-VMI3 may be migrated from the host 390, as explained in reference to FIG. 1, and launched as VMI1, VMI2, and VMI3, respectively, at the host computer 305b within the data center 300.

The original VMIs (VMI1-VMI3 running on host 390 within the remote computing system 345a) may be connected in a private subnet 391. Upon migration, the newly launched VMIs (VMI1-VMI3 in host server 305b) may also be placed in a private subnet 393. Additionally, as part of the migration process, the name and the IP address of the host server computer 305b may be changed to be the same as the name (e.g., "HOST 1") and the IP address (e.g., IP1) of the host server 390 within the enterprise-based network of the computing system 345a.

This example data center further includes multiple physical networking devices, such as switches 315a and 315b, edge routers 325a-325c, and core routers 330a-330c. Switch 315a is part of a physical network that includes physical computing systems 305a-305c, and is connected to edge router 325a. Switch 315b is part of a distinct physical network that includes physical computing systems 305d, 355a-355n, and the computing system(s) providing the CSP node communication manager module 350 and the CSP system manager module 310, and is connected to edge router 325b. The physical networks established by switches 315a-315b, in turn, are connected to each other and other networks (e.g., the public network 335) via an intermediate interconnection network 320, which includes the edge routers 325a-325c and the core routers 330a-330c. The edge routers 325a-325c provide gateways between two or more networks. For example, edge router 325a provides a gateway between the physical network established by switch 315a and the interconnection network 320. Edge router 325c provides a gateway between the interconnection network 320 and public network 335. The core routers 330a-330c manage communications within the interconnection network 320, such as by forwarding packets or other data transmissions as appropriate based on characteristics of such data transmissions (e.g., header information including source and/or destination substrate network addresses, protocol identifiers, etc.) and/or the characteristics of the interconnection network 320 itself (e.g., routes based on physical network topology, etc.).

The illustrated node communication manager modules manage communications sent to and from associated computing nodes. For example, node communication manager module 309a manages associated virtual machine computing nodes 307a, node communication manager module 309b manages associated virtual machine computing nodes 307d, and each of the other node communication manager modules may similarly manage communications for a group of one or more other associated computing nodes. The illustrated node communication manager modules may manage communications between computing nodes so as to overlay a particular virtual network over the intermediate physical substrate network (e.g., the interconnection network 320 and the physical networks associated with switches 315a and 315b), and may implement firewall policies and other network access constraints to control such communications. The external communication manager module 370 manages external communications that enter and leave the data center 300, such as to further implement the overlay networks over the substrate network within the data center 300 with regard to such external communications. The external communication manager module 370 may take actions to implement firewall policies and other network access constraints, including at least some configured access mechanisms for provided computer networks that allow private or other specialized access to remote resource services external to the data center 300, and optionally at least some VPN connections to external remote client computer networks, or may instead operate in conjunction with other hardware and/or software (not shown) that implements the compute service provider's portion of such VPN connections.

Thus, as one illustrative example, one of the virtual machine computing nodes 307a on computing system 305a may be part of a particular provided virtual computer network (e.g., provided computer network 220A of FIG. 2B) for a client, along with one of the virtual machine computing nodes 307d on computing system 305d and with the computing system 355a (and optionally other computing nodes in this data center or in one or more other data centers 360 that are also used by the compute service provider), and with 1Pv4 being used to represent the virtual network addresses for the virtual network. Other of the virtual machine computing nodes 307a, virtual machine computing nodes 307d, and computing systems 355b-355n (as well as other of the illustrated computing nodes) may be currently dedicated to other computer networks being provided to other clients, may be currently unassigned to a provided computer network and available for use by the compute service provider, and/or may also be part of the same particular provided virtual computer network. A program executing for the client on the virtual machine computing node 307a that is part of the particular provided virtual computer network may then direct an outgoing communication (not shown) to the virtual machine computing node 307d of the particular provided virtual computer network, such as by specifying a virtual network address for that provided virtual computer network that is assigned to that destination virtual machine computing node 307d. The node communication manager module 309a receives the outgoing communication, and in at least some embodiments determines whether to authorize the sending of the outgoing communication, such as based on previously configured information about the sending virtual machine computing node 307a and/or about the destination virtual machine computing node 307d, and/or by dynamically interacting with the system manager module 310 (e.g., to obtain an authorization determination, to obtain some or all such information, etc.).

If the node communication manager module 309a determines that the outgoing communication is authorized (or does not perform such an authorization determination), the module 309a determines the actual physical substrate network location corresponding to the destination virtual network address for the communication. In this example, the interconnection network uses 1Pv6 to represent the actual network addresses for computing nodes connected via the interconnection network, and the module 309a re-headers the outgoing communication so that it is directed to node communication manager module 309d using an actual 1Pv6 substrate network address. The node communication manager module 309a may determine the actual 1Pv6 destination network address to use for the virtual network address of the destination virtual computing node 307d by, for example, dynamically interacting with the system manager module 310, or may have previously determined and stored that information (e.g., in response to a prior request from the sending virtual machine computing node 307a for information about that destination virtual network address, such as a request using Address Resolution Protocol, or ARP). In this example, the actual 1Pv6 destination network address that is used embeds the virtual destination network address and additional information, so as to send the communication over the overlay network without encapsulation.

When the node communication manager module 309d receives the communication via the interconnection network 320, it extracts the virtual destination network address and additional information from the actual 1Pv6 destination network address, and determines to which of the virtual machine computing nodes 307d that the communication is directed. The node communication manager module 309d next optionally determines whether the communication is authorized for the destination virtual machine computing node 307d, such as by extracting the virtual source network address and additional information from the actual 1Pv6 source network address, and confirming that the computing node with that virtual source network address is actually managed by the node communication manager module that forwarded the communication (in this example, node communication manager module 309a), so as to prevent spoofing of source network addresses by malicious senders. If the communication is determined to be authorized (or the node communication manager module 309d does not perform such an authorization determination), the module 309d then re-headers the incoming communication so that it is directed to the destination virtual machine computing node 307d using an appropriate 1Pv4 network address for the virtual network, such as by using the sending virtual machine computing node's virtual network address as the source network address and by using the destination virtual machine computing node's virtual network address as the destination network address.

After re-headering the incoming communication, the module 309d then forwards the modified communication to the destination virtual machine computing node. In at least some embodiments, before forwarding the incoming communication to the destination virtual machine, the module 309d may also perform additional steps related to security. For example, the module 309d may verify that the sending virtual machine computing node is authorized to communicate with the destination virtual machine (e.g., based on belonging to the same virtual network and/or on network access constraint information specified for that provided virtual network, being associated with the same customer or other entity, being associated with different entities whose computing nodes are authorized to intercommunicate, etc.) and/or that the incoming communication is of an allowed type, such as based on information previously obtained by the module 309d or based on interacting with the system manager module 310.

If the sending virtual machine computing node 307a instead (or in addition) directs an outgoing communication (not shown) to one or more intended destination computing systems external to the data center 300, the node communication manager module 309a receives and handles the outgoing communication in a similar manner. An intended external destination computing system may be, for example, another computing node that is part of the same particular provided virtual computer network (e.g., on a remote virtual client computer network for which the particular provided computer network is an extension, or at another data center 360 that is also used by the compute service provider to provide a portion of the particular virtual computer network), a computing system of a remote resource service, a computing system that is publicly accessible on the Internet, etc. In at least some embodiments and situations, the module 309a may first determine whether to authorize the sending of the outgoing communication, and if so determines the actual physical substrate network location corresponding to the destination network address for the communication. In this example, the determined physical substrate network location corresponds to the external communication manager module 370, such as if the module 370 is associated with all virtual and/or actual network addresses that are not otherwise assigned to node communication manager modules. When the module 370 receives the communication via the interconnection network 320, it similarly extracts the destination network address and additional information from the received communication, and determines whether and how to forward the communication, including optionally determining whether the communication is authorized for the intended destination. If the communication is determined to be authorized (or the module 370 does not perform such an authorization determination), the module 370 then re-headers the incoming communication so that it is directed to the destination using an appropriate 1Pv4 public network address (or other network address appropriate for the public network 335), and then forwards the modified communication over the public network 335.

Thus, as noted above, the external communication manager module 370 handles outgoing communications from provided computer networks in the illustrated embodiment, including outgoing communications sent to remote resource services via configured access mechanisms for those remote resource services. If the outgoing communication is being sent to a remote resource service via a configured access mechanism for the particular provided computer network, the module 370 and/or the sending computing node's associated node communication manager module may take further actions in at least some embodiments and situations. For example, the particular provided virtual computer network may have a configured access mechanism for a particular remote resource service (e.g., a remote resource service provided via one or more of the computing systems 345b or via one or more computing systems at another data center 360) that is mapped to a particular namespace of that remote resource service, and the sending virtual machine computing node 307a may send the communication via that configured access mechanism. The configured access mechanism to that remote resource service for the particular provided computer network may be, for example, a virtual network address of the particular provided computer network that is assigned to represent that configured access mechanism, and if so that assigned virtual network address may be associated with the module 370 to cause the outgoing communication to be directed to the module 370.

Before forwarding such an outgoing communication to the remote resource service via the public network 335, the module 370 may take various actions to reflect the configuration for the access mechanism used, such as to modify the outgoing communication to reference or otherwise use the particular namespace to which the access mechanism corresponds. In such situations, the module 370 may determine the namespace and other configuration information for the access mechanism in various ways, such as by storing the configuration information locally, contacting the system manager module 310 to obtain the configuration information, etc. In addition, the module 370 may determine how and when to modify communications to use the particular namespace in various manners, such as by the remote resource service having previously provided corresponding configuration information to the compute service provider (e.g., an indication of one or more particular message parameters that indicate a namespace; an indication of one or more particular message parameters used to name or reference resources, which may optionally include a namespace identifier; an indication of types of messages that allow a namespace to be indicated or that otherwise use namespace information; etc.).

As one particular illustrative example, the remote resource service may provide data storage services, and the outgoing communication may be a request to access a particular storage-related resource (e.g., to retrieve a stored object or other group of stored data). If so, the particular storage resource may have been previously created by the client as part of a namespace defined by the client, such as by using a computing system external to the provided computer network (e.g., on a remote private computer network of the client. By configuring the access mechanism for the particular provided computer network to use that same namespace, the computing nodes of the provided computer network may access and use existing stored resources of the client. As an illustrative example, if the remote private computer network of the client is a corporate network, the client may use different namespaces to store different types of data, such as to store sensitive human resources data in a first namespace, to store restricted software development software and other data in a second namespace, and to store other corporate data that is generally available throughout the corporation via a third namespace.

If the provided computer network of the compute service provider is used by only a particular subset of the corporation (e.g., human resource personnel), the access mechanism to the remote resource service for the particular provided computer network may be configured to use the first namespace for the sensitive human resources data. Furthermore, the particular provided computer network may optionally have a second access mechanism configured to the remote resource service (e.g., using a different assigned virtual network address of the provided computer network), such as to use the third namespace for the generally available corporate data, so that the computing nodes of the particular provided computer network may interact with different local virtual network addresses of the particular provided computer network to obtain access to different groups of resources.

As another illustrative example, the access mechanism to the remote resource service for the particular provided computer network may instead be configured to allow only computing nodes of the particular provided computer network to have access to storage resources that are created and used by those computing nodes. If so, the compute service provider may determine a new namespace to use with the particular provided computer network, such as by automatically generating a new namespace (e.g., without providing that information to the computing nodes of the particular provided computer network) or by using a new namespace that is indicated by the client with the configuration information, and may configure the access mechanism to use the new namespace. The compute service provider or a computing node of the particular provided computer network may further need to take initial action to create the new namespace within the remote resource service, depending on the remote resource service. Once the new namespace is available, the computing nodes of the particular provided computer network may similarly use the configured access mechanism to interact with the remote resource service to create new stored resources that are part of the new namespace and to access such stored resources, and the external communication manager module 370 will similarly modify the outgoing communications as appropriate to use the new namespace.

In addition to or instead of being configured to implement a configured access mechanism corresponding to a particular namespace within a particular remote resource service, the external communication manager module 370 may in some embodiments be configured to include one or more additional indicators related to access control for some or all communications sent to that remote resource service via that access mechanism, and the sending virtual machine computing node 307a may send such a communication via that configured access mechanism. Before forwarding such an outgoing communication to the remote resource service via the public network 335, the module 370 may take various actions to reflect the configuration for the access mechanism used, such as to modify the outgoing communication to include the one or more additional indicators to which the access mechanism corresponds, such as by modifying the header and/or body of the communication in a manner specific to the remote resource service (e.g., if the remote resource service allows client specification of one or more access control indicators, to include the one or more additional indicators in a manner supported by the remote resource service, whether instead of or in addition to any indicators specified by the sending virtual machine computing nodes 307a). In such situations, the module 370 may determine the additional indicator(s) for the access mechanism in various ways, such as by storing the information locally, contacting the system manager module 310 to obtain the information, etc. In addition, the module 370 may determine how and when to modify communications to use the particular additional indicator(s) in various manners, such as by the remote resource service having previously provided corresponding configuration information to the compute service provider (e.g., an indication of one or more particular message parameters that indicate such access control indicators; an indication of one or more particular message parameters used to access resources, which may optionally include one or more such access control indicators; an indication of types of messages that allow one or more such access control indicators to be specified or that otherwise use such access control indicators; etc.).

In a manner similar to the examples previously discussed with respect to the use of namespace information with the configured access mechanism, the remote resource service may provide data storage services, and the outgoing communication may be a request to access a particular storage-related resource (e.g., to retrieve a stored object or other group of stored data). If so, the particular storage resource may have been previously created by one of the computing nodes of the provided computer network to which the sending virtual machine computing node 307a belongs, or may be being newly created or accessed as part of the current communication. In some embodiments, the compute service provider may further need to take initial action to specify the one or more additional indicators for use within the remote resource service (e.g., to define them), depending on the remote resource service. The sending virtual machine computing node 307a and the associated client may be unaware of the use of the additional indicator(s), but the external communication manager module 370 will nonetheless modify the outgoing communications as appropriate to use the associated indicator(s).

Furthermore, as noted above, the external communication manager module 370 handles outgoing communications in the illustrated embodiment that are from provided computer network extensions to remote computer networks to which the extensions correspond, such as outgoing communications sent via a configured VPN connection to a particular remote computer network. In at least some embodiments, the compute service provider provides a remote access establishment API that allows a client to programmatically initiate the establishment of such a VPN connection from a location remote to the data center 300 to the computer network provided for the client at the data center 300, such as to cause appropriate hardware devices, software and/or configuration information to be delivered to the remote location for use by the client in establishing the VPN connection. For example, one of the computing systems 345b may correspond to an online retailer that sells or otherwise provides such hardware devices and/or software, and if so the compute service provider may use a separate API provided by the retailer to place an order for such hardware devices and/or software for delivery to the remote location or other designated location corresponding to the client (e.g., as specified by the client as part of invoking the provided API of the compute service provider, based on information previously stored by the compute service provider for the client, based on information previously stored by the retailer for the client, etc.). Once such a VPN connection or other secure connection is established to allow the client to have remote access to the provided computer network, the module 370 may further take actions to support the secure connection, such as by using the secure connection to send an outgoing communication that is intended for one or more destination computing systems at the remote location to which the secure connection corresponds.

Thus, as described above with respect to FIG. 3, in at least some embodiments, the compute service provider provides virtual computer networks to clients by implementing them as overlay networks using an underlying substrate network, such as using various node communication manager modules of the compute service provider and one or more external communication manager modules of the compute service provider. In at least some embodiments, one or more system manager modules may further facilitate configuring communications between computing nodes, such as by tracking and/or managing which computing nodes belong to which provided virtual networks, and by providing information about actual physical substrate network addresses that correspond to virtual network addresses used for a particular virtual network (e.g., by a particular customer or other entity). In addition, a system manager module may receive an indication of a virtual machine computing node on a target physical computing system and of a provided virtual network to which the virtual machine is to be associated, and then initiate configuration of a virtual machine node communication manager module for the target physical computing system so as to associate the virtual machine with the virtual network, or the node communication manager module may instead initiate that configuration (e.g., when the virtual machine first initiates or receives a communication).

In at least some embodiments, detection and/or prevention of unauthorized communications may be based at least in part on a topology of the one or more intermediate substrate networks on which a virtual network is overlaid, as previously noted. In such embodiments, the physical network address used for such a computing node for communications over the substrate network includes an indication of the computing node's virtual network address, and includes a partial network address for the substrate network that corresponds to a location of the computing node's associated node communication manager module (e.g., a sub-network or other portion of the substrate network for which the node communication manager module manages communications). Thus, in order for a malicious user to correctly construct a valid physical network address for a computing node that is part of a virtual network, the malicious user would need to gain access to information about the virtual network to which the computing node belongs, to gain access to information about the topology of the computing node's physical substrate network location in order to determine the partial network address for the associated node communication manager module, and to determine how to use that information to construct the physical network address.

The validity of constructed physical network addresses may be checked in various ways, such as by identifying a computing node to which a virtual address embedded in a constructed physical network address corresponds, and verifying that a location of that identified computing node corresponds to one of the computing nodes in the portion of the substrate network that corresponds to the partial network address (e.g., one of the computing nodes managed by a node communication manager module to which the partial network address corresponds). In addition, the validity of constructed physical network addresses may be checked at various times, such as by a node communication manager module that receives an incoming communication intended for a destination computing node (e.g., to verify that the source physical network address is valid), by a manager module that receives a message purportedly from a node communication manager module on behalf of an indicated managed computing node (e.g., a message to request a physical network address for an intended destination computing node of interest), etc.

Figure 4:
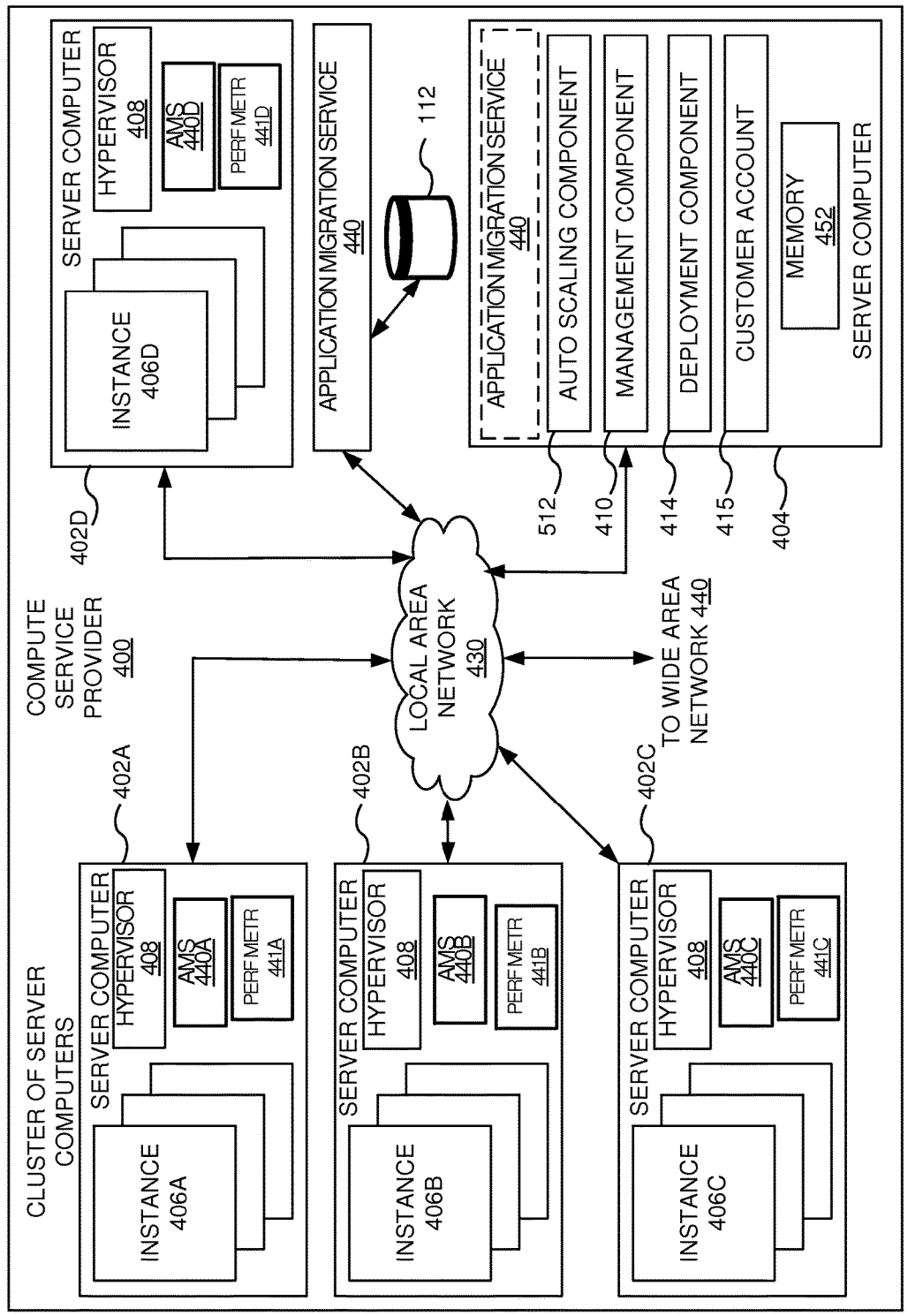
FIG. 4 is an example system diagram showing a plurality of virtual machine instances running in a multi-tenant environment using an application migration service, in accordance with an example embodiment of the disclosure.

FIG. 4 is an example system diagram showing a plurality of virtual machine instances running in a multi-tenant environment using an application migration service, in accordance with an example embodiment of the disclosure. More specifically, FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients (e.g., tenants or customers).

In an example embodiment, the compute service provider 400 can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). In this regard, the plurality of customers (e.g., multiple enterprises) can rent resources, such as server computers, within the multi-tenant environment.

Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked customer devices, such as desktop computers, laptops, tablets, smartphones, etc. running web browsers or other lightweight customer applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise an application migration service (AMS) (e.g., 440A-440D) and performance metric modules (e.g., 441A-441D). The application migration services 440A-440D may have similar functionalities as the application migration service 140a described in reference to FIG. 1. Additionally, the performance metric modules 441A-441D may provide performance metrics for the corresponding hosts (402A-402D) for purposes of determining a VMI type and a host server type when the application migration service migrates applications (and associated virtual machine instances) from an enterprise-based network to the cloud network of the compute service provider 400. The performance metric modules 441A-441D have functionalities similar to the performance metric module 139 in FIG. 1.

Figure 5:
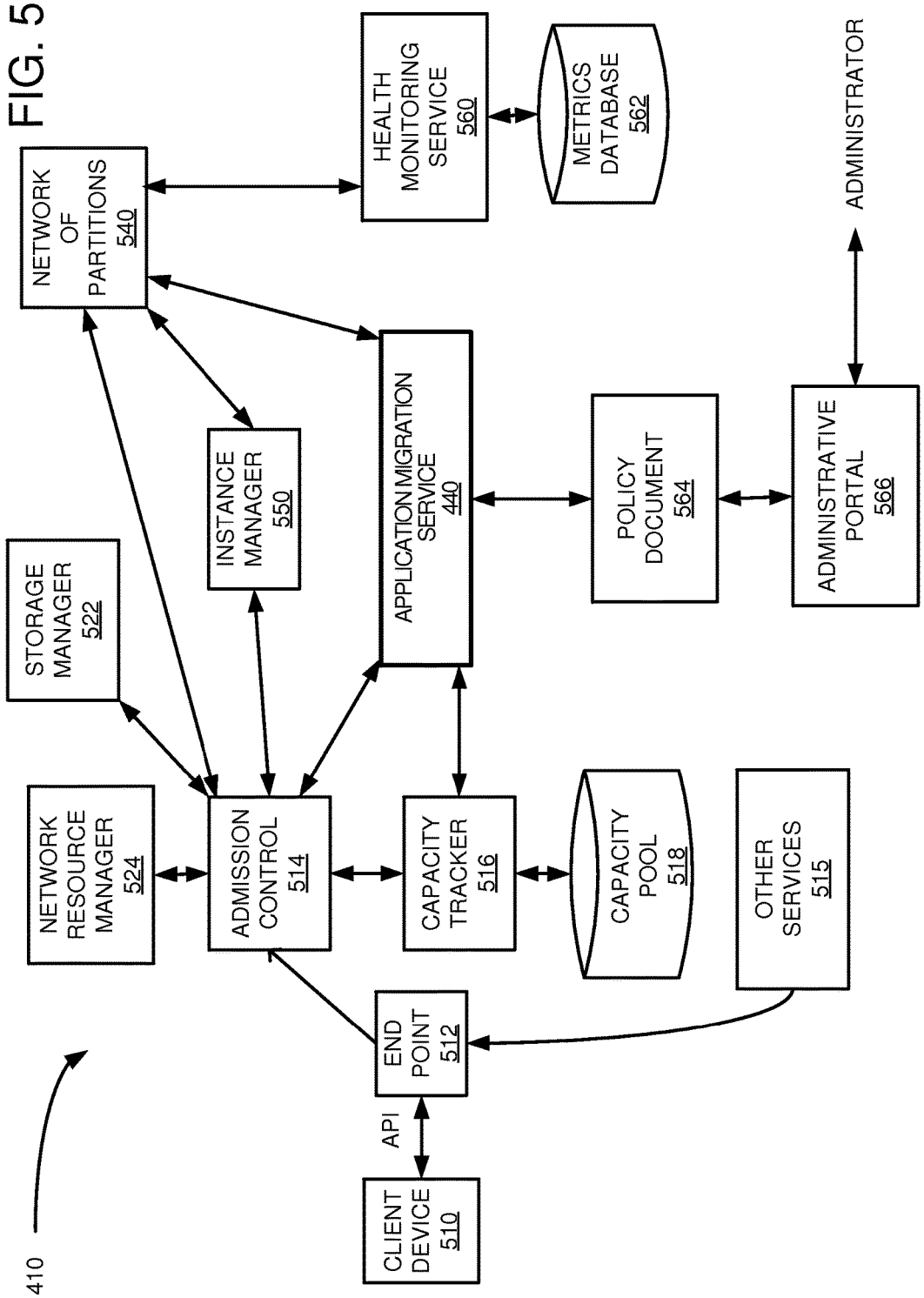
FIG. 5 shows further details of an example system including a plurality of management components associated with a control plane, which may be used to migrate one or more applications according to one embodiment.

The compute service provider 400 may also comprise an application migration service 440. The application migration service 440 may comprise suitable circuitry, logic, and/or code and may be operable to perform the functionalities described herein (e.g., similar to the functionalities of the application migration service 140a described in reference to FIGS. 1-3) including using resource monitoring metrics, dependency information, and private subnet information to migrate applications from an enterprise-based network (i.e., a private client network) to a cloud network of a compute service provider. The application migration service 440 may be implemented as a stand-alone service within the provider 400, as a dedicated server (similar to the servers 402A-402D), and/or may be implemented as part of the server computer 404 that performs management functions (or as part of the individual server computers 402A-402D, as explained above). For example, the application migration service 440 may be implemented as a software application running on the server's operation system (e.g., as part of the management component 410 (as seen in FIG. 5)).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the application migration service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component 410 can further include a policy document (e.g., 564 in FIG. 5) to implement customer policies, such as policies related to the application migration service 440.

The server computer 404 may further comprise memory 452, which may be used as processing memory by the application migration service 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the compute service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to migrate one or more virtual machine instances according to one embodiment. More specifically, FIG. 5 illustrates in further detail the management component 410, which may implement the discontinuous migration service 140 within the multi-tenant environment of the compute service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the compute service provider 400 through an end point 512, which can be a DNS address designed to receive and process application programming interface (API) requests. In particular, the end point 512 can be a web server configured to expose an API. Using the API requests (e.g., 190 in FIG. 1), a customer device 510 can make requests to implement any of the functionality described herein (e.g., request dependency information 155, resource monitoring metrics 160, and private subnet information 150 for migrating an application, as described in reference to FIG. 1). Other services 515, which can be internal to the compute service provider 400, can likewise make API requests to the end point 512. For example, the customer device 510 may use the API requests (e.g., 190 in FIG. 1) to communicate a customer request associated with migrating an application (e.g., a customer may, in response to a recommendation from the compute service provider, confirm the recommendation of a VMI type and host server type for purposes of selecting a VMI and a host for migrating the application; the customer may also provide their own selection of a specific type of VMI and host for the migration). The API requests (e.g., 190) from the client 114 can pass through the admission control 514 and onto the application migration service 440 in order to access the policy document 564 and/or to request migration-related services. An administrative portal 566 can be used to access and make changes to the policy document 564 by an administrator of either the customer or the compute service provider 300.

The policy document 564 may specify, for example, one or more policies related to selecting a VMI type and a server computer type when migrating applications from an enterprise-based network to the compute service provider. More specifically, the policy document 564 may specify one or more VMI types and one or more server architecture types (e.g., based on memory, CPU speed, disk space, etc.), and may provide a recommendation of both the VMI type and the server architecture type that can be automatically selected based on matching of resource monitoring metrics and the performance metrics of the available host servers and VMIs.

Other general management services that may or may not be included in the compute service provider 400 (and/or within the management component 410) include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The application migration service 440 may perform the migration-related functionalities described herein (e.g., as described in reference to 140*a* and/or 140*b*). The application migration service 440 may communicate with the capacity tracker 516 to receive information regarding available partitions and/or host servers that can be used for migrating and launching an instance (or other network resources requested by a customer entity). Additionally, communications with the admission control 514 may be used to launch a migrated instance, and communications with the network of partitions 540 may be used to perform migration-related functionalities affecting a plurality of partitions (e.g., migrating a plurality of VMIs running on one or more server computers).

Figure 6:
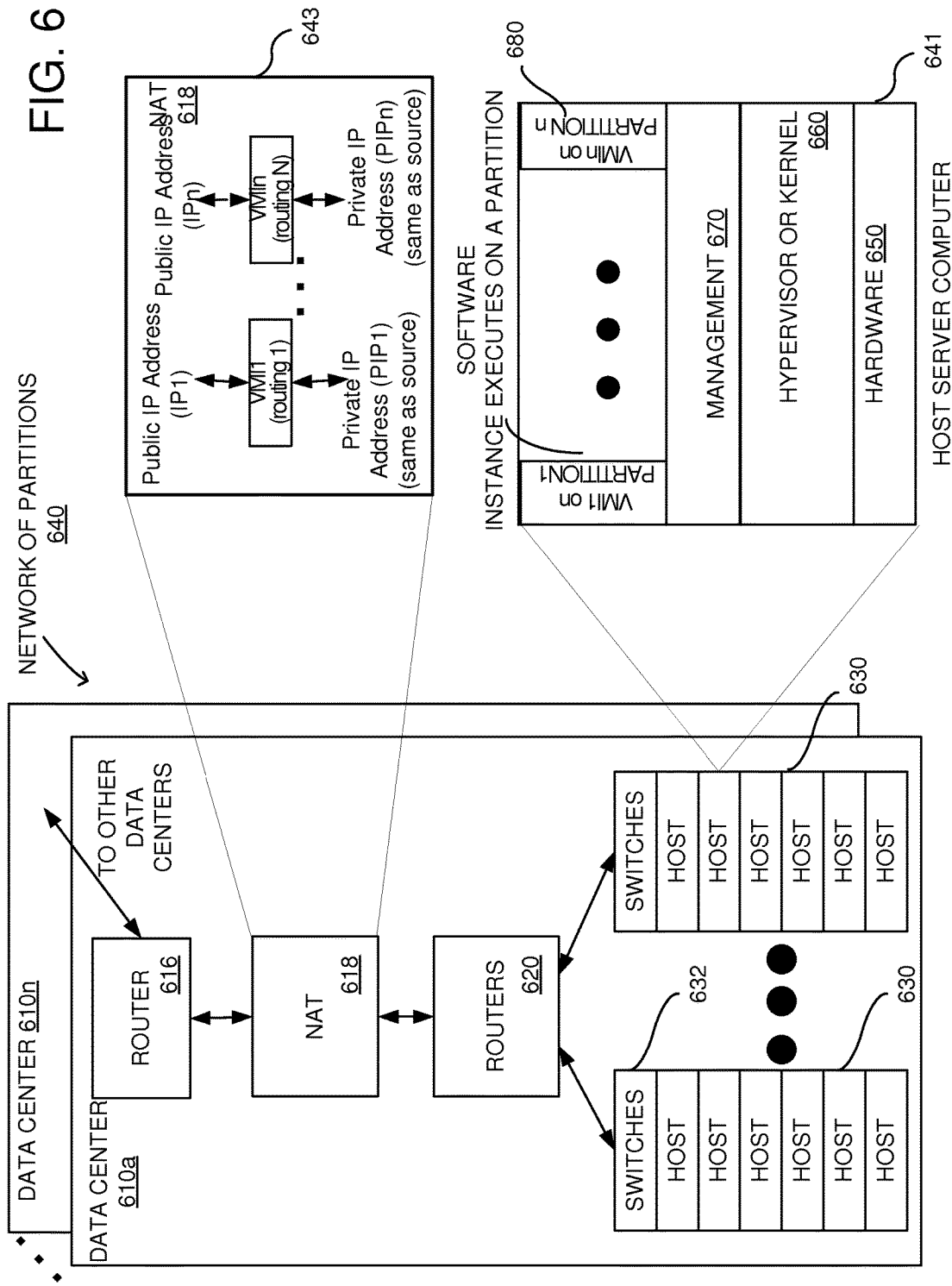
FIG. 6 shows an example of a plurality of host computers, routers and switches, which are hardware assets used for running virtual machine instances—with the host computers having application migration-related functionalities that may be configured according to one embodiment of the disclosure.

FIG. 6 shows an example of a plurality of host computers, routers and switches, which are hardware assets used for running virtual machine instances—with the host computers having application migration-related functionalities that may be configured according to one embodiment of the disclosure. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650, which may include a network interface card, one or more CPUs, memory, and so forth (not illustrated in FIG. 6). Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions.

Additionally, when a virtual machine instance (e.g., VMI1) is migrated (e.g., from the host server 390 within the client private network 340 of the computing system 345a to the host server 305b in the data center 300 of the compute service provider), the newly launched VMI1 will be associated with the same public and private IP addresses as was used for the previous VMI1 of the computing system 345a. This is illustrated at the expanded view 643 of the NAT 618. As seen at 643, even though each VMI launched in the data center 610a after an application/VMI migration (or each server running the VMI in the data center 610a) is associated with a public IP address (IP1, . . . , IPn) and a private IP address (PIP1, . . . , PIPn) that are the same as the public/private IP address of the enterprise-based network VMI that was migrated. Additionally, routing information (i.e., routing information for the specific server computer hosting the VMI) may also remain different (e.g., routing information "routing 1" is associated with VMI1 and routing information "routing n" is associated with VMIn).

Figure 7:
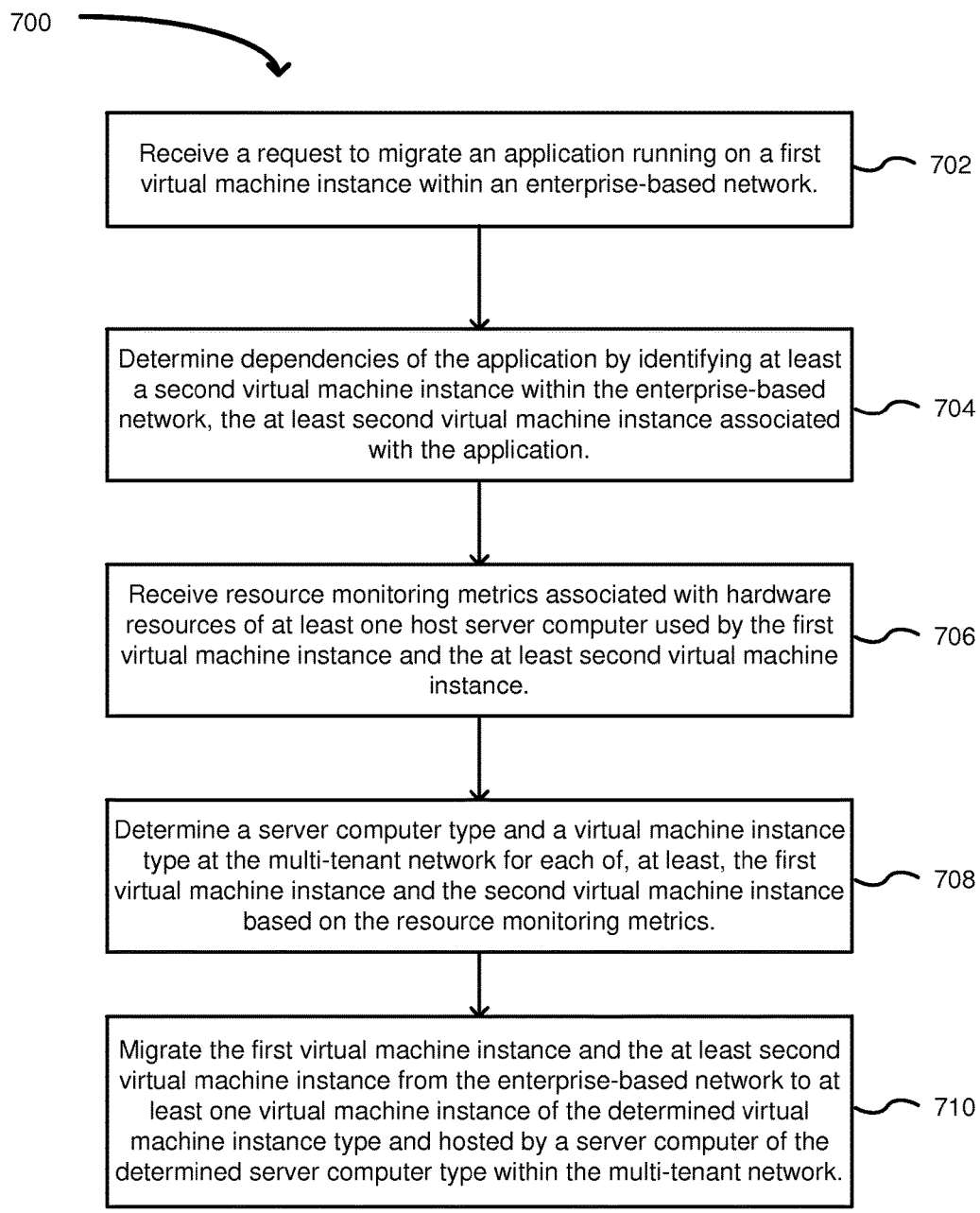
FIG. 7 is a flowchart of an example method of migrating applications from an enterprise-based network to a multi-tenant network of a compute service provider, in accordance with an embodiment of the disclosure.

FIG. 7 is a flowchart of an example method of migrating applications from an enterprise-based network to a multi-tenant network of a compute service provider, in accordance with an embodiment of the disclosure. Referring to FIGS. 1-3 and 7, the example method 700 may start at 702, when a request to migrate an application running on a first virtual machine instance may be received within an enterprise-based network. For example, a user may use the interface 122 to specify an application name (e.g., name of the application 185) and may initiate the migration by activating the software button 122b.

At 704, dependencies of the application may be determined by identifying at least a second virtual machine instance within the enterprise-based network, the at least second virtual machine instance associated with the application. For example, the application migration service 140a may use one of the API requests 190 to obtain dependency information 155. The dependency information 155 may identify the application selected for migration (e.g., 185), the VMI it runs on (e.g., 180a), and one or more additional VMIs the application 185 uses or depends on (e.g., VMIs 180b-180c).

At 706, resource monitoring metrics associated with hardware resources used by the first virtual machine instance and the at least second virtual machine instance may be received. For example, the application migration service 140a may use one of the API requests 190 to obtain resource monitoring metrics 160, which provide information on use of host server computing resources by the VMIs 180a-180c (i.e., computing resources associated with the host server 175a hosting the VMIs 180a-180c). At 708, a server computer type and a virtual machine instance type may be determined at the multi-tenant network for each of, at least, the first virtual machine instance and the second virtual machine instance based on the resource monitoring metrics.

For example, after obtaining the dependency information 155 and the resource monitoring metrics 160, the application migration service 140a may match one or more of the resource monitoring metrics 160 with performance metrics 139 of host server 105a (or any of the remaining host servers 105a, . . . , 105n) to select or otherwise determine (e.g., from a policy document such as 564) a virtual machine instance type (for migrating the VMIs 180a-180c) and a host server computer type within the compute service environment 100 to host the migrated VMIs (with the migrated application) from the client private network 170. The performance metrics 139 may include one or more of CPU speed, memory capacity, storage capacity, network card characteristics (e.g., speed), video card characteristics (e.g., resolution and video processing speed), disk I/O speed, and so forth, for the host server computer 105a (or any of the remaining host servers 105a, . . . , 105n).

At 710, the first virtual machine instance and the at least second virtual machine instance may be migrated from the enterprise-based network to at least one virtual machine instance of the determined virtual machine instance type. For example, the VMIs 180a-180c may be migrated from the client private network 170 to the compute service environment 100. More specifically, at least one file packing format (e.g., OVF) may be used to package the VMIs 180a-180c, migrate them to the compute service environment 100, and launch them on the VMIs of the selected VMI type and hosted by a host server of the selected host server computer type as indicated by the host/VMI type selection 141b. The migrated VMIs 180a-180c may be transferred (i.e., VMI transfer 141c) and launched on the selected VMIs hosted by one or more of the selected host server computers.

The first virtual machine instance (e.g., 180a) may be migrated from the enterprise-based network (170) to at least a first virtual machine instance of the determined virtual machine instance type (e.g., one of 130a, . . . , 130n) at the compute service environment 100. The at least second virtual machine instance (180b-180c) may be migrated from the enterprise-based network (170) to at least a second virtual machine instance of the determined virtual machine instance type, the at least first and at least second virtual machine instances hosted by the server computer (105a) within the multi-tenant network (100).

The enterprise-based network (170) may include a private network. The application migration service 140a may determine whether the first virtual machine instance (180a) and the at least second virtual machine instance (180b-180c) are in a sub-network of the private network. If the first virtual machine instance (180a) and the at least second virtual machine instance (180b-180c) are in the sub-network (245) of the private network, the application migration service 140a may create a sub-network (250) within the multi-tenant network (205) for the at least one virtual machine instance (VMI1) running the migrated application.

The application migration service 140a may determine a name and an IP address for the at least one host server computer (175a) hosting the first virtual machine instance (180a) and the at least second virtual machine instance (180b-180c) in the enterprise-based network. The application migration service 140a may assign a name and an IP address to the server computer (e.g., 105a) of the server computer type within the multi-tenant network, the name and the IP address being the same as a name and an IP address associated with the at least one host server computer (e.g., 175a) in the enterprise-based network (170).

Figure 8:
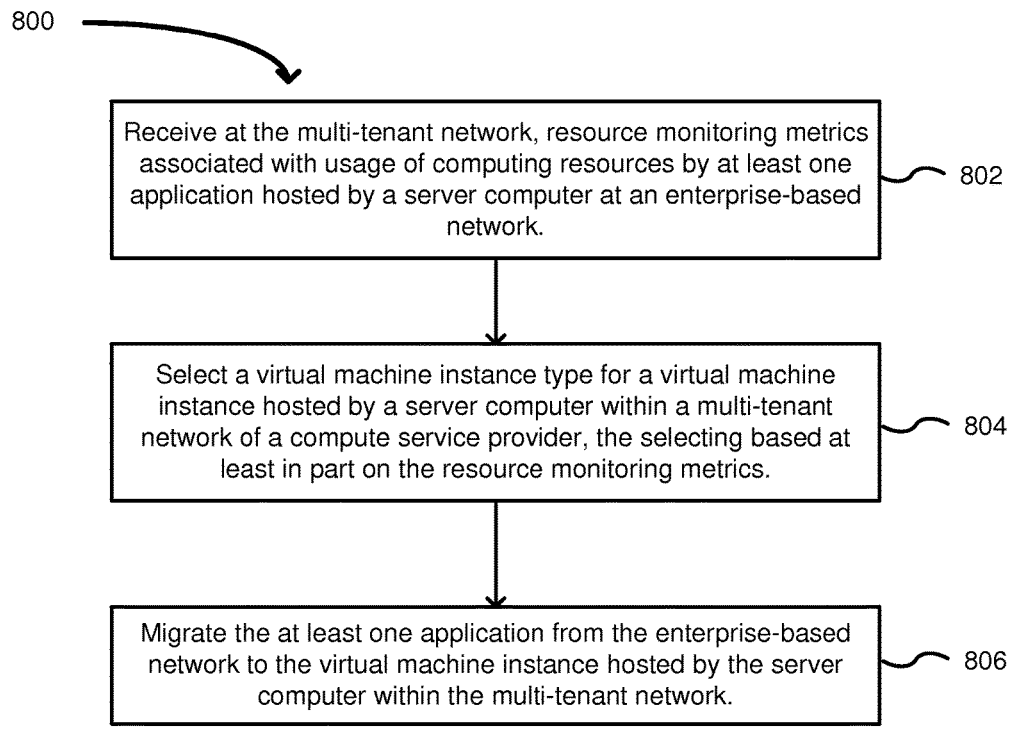
FIG. 8 is a flowchart of another example method of migrating applications from an enterprise-based network to a multi-tenant network of a compute service provider, in accordance with an embodiment of the disclosure.

FIG. 8 is a flowchart of another example method of migrating applications from an enterprise-based network to a multi-tenant network of a compute service provider, in accordance with an embodiment of the disclosure. Referring to FIGS. 1-3 and 8, the example method 800 may start at 802, when, resource monitoring metrics associated with usage of computing resources by at least one application hosted by a server computer at an enterprise-based network may be received at a multi-tenant network. For example, the application migration service 140a may use one of the API requests 190 to obtain resource monitoring metrics 160, which provide information on use of host server computing resources by the VMIs 180a-180c associated with application 185 (i.e., computing resources associated with the host server 175a hosting the VMIs 180a-180c, which resources are being used by the application 185).

At 804, a virtual machine instance type may be selected for a virtual machine instance hosted by a server computer within the multi-tenant network of the compute service provider, the selecting based at least in part on the resource monitoring metrics. For example, after obtaining the dependency information 155 and the resource monitoring metrics 160, the application migration service 140a may match one or more of the resource monitoring metrics 160 with performance metrics 139 of host server 105a (or any of the remaining host servers 105a, . . . , 105n) to select or otherwise determine (e.g., from a policy document such as 564) a virtual machine instance type (for migrating the VMIs 180a-180c) and a host server computer type within the compute service environment 100 to host the migrated VMIs (with the migrated application) from the client private network 170. The performance metrics 139 may include one or more of CPU speed, memory capacity, storage capacity, network card characteristics (e.g., speed), video card characteristics (e.g., resolution and video processing speed), disk I/O speed, and so forth, for the host server computer 105a (or any of the remaining host servers 105a, . . . , 105n).

At 806, the at least one application may be migrated from the enterprise-based network to the virtual machine instance hosted by the server computer within the multi-tenant network. For example, the VMIs 180a-180c may be migrated from the client private network 170 to the compute service environment 100. More specifically, at least one file packing format (e.g., OVF) may be used to package the VMIs 180a-180c, migrate them to the compute service environment 100, and launch them on the VMIs of the selected VMI type and hosted by a host server of the selected host server computer type as indicated by the host/VMI type selection 141b. The migrated VMIs 180a-180c may be transferred (i.e., VMI transfer 141c) and launched on the selected VMIs hosted by one or more of the selected host server computers.

Figure 9:
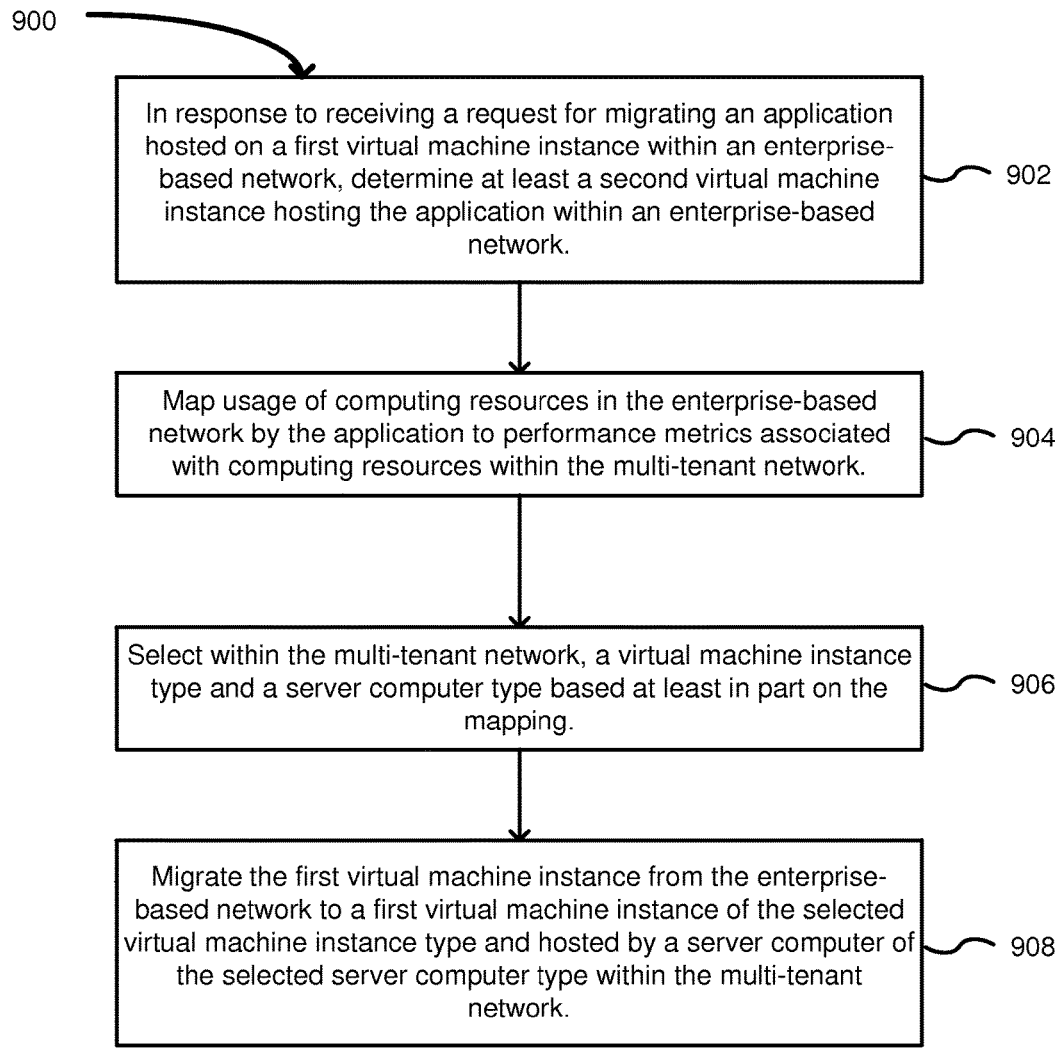
FIG. 9 is a flowchart of yet another example method of migrating applications from an enterprise-based network to a multi-tenant network of a compute service provider, in accordance with an embodiment of the disclosure.

FIG. 9 is a flowchart of yet another example method of migrating applications from an enterprise-based network to a multi-tenant network of a compute service provider, in accordance with an embodiment of the disclosure. Referring to FIGS. 1-3 and 9, the example method 900 may start at 902, when in response to receiving a request for migrating an application hosted on a first virtual machine instance within the enterprise-based network, at least a second virtual machine instance hosting the application within the enterprise-based network may be determined. For example, the application migration service 140a may use on the API requests 190 to obtain dependency information 155. The dependency information 155 may identify the virtual machine the application 185 is running on (i.e., VMI 180a) as well as any other VMIs that the application 185 may use (or depend on) (i.e., VMIs 180b-180c).

At 904, usage of computing resources in the enterprise-based network by the application may be mapped to performance metrics associated with computing resources within the multi-tenant network. At 906, a virtual machine instance type and a server computer type may be selected within the multi-tenant network based at least in part on the mapping. For example, after obtaining the dependency information 155 and the resource monitoring metrics 160, the application migration service 140a may map one or more of the resource monitoring metrics 160 to performance metrics 139 of host server 105a (or any of the remaining host servers 105a, . . . , 105n) to select a virtual machine instance type (for migrating the VMIs 180a-180c) and a host server computer type within the compute service environment 100 to host the migrated VMIs (with the migrated application) from the client private network 170. The performance metrics 139 may include one or more of CPU speed, memory capacity, storage capacity, network card characteristics (e.g., speed), video card characteristics (e.g., resolution and video processing speed), disk I/O speed, and so forth, for the host server computer 105a (or any of the remaining host servers 105a, . . . , 105n).

At 908, the first virtual machine instance may be migrated from the enterprise-based network to a first virtual machine instance of the selected virtual machine instance type and hosted by a server computer of the selected server computer type within the multi-tenant network, thereby migrating the application from the enterprise-based network to the multi-tenant network. For example, the VMIs 180a-180c may be migrated from the client private network 170 to the compute service environment 100. More specifically, at least one file packing format (e.g., OVF) may be used to package the VMIs 180a-180c, migrate them to the compute service environment 100, and launch them on the VMIs of the selected VMI type and hosted by a host server of the selected host server computer type as indicated by the host/VMI type selection 141b. The migrated VMIs 180a-180c may be transferred (i.e., VMI transfer 141c) and launched on the selected VMIs hosted by one or more of the selected host server computers.

In accordance with an example embodiment of the disclosure and in reference to any of the methods described in FIGS. 7-9, the application migration service 140a may perform the VPC and subnet creation and assignment (141a) as an initial step, prior to host/VMI type selection (141b) and the VMI transfer (141c).

Figure 10:
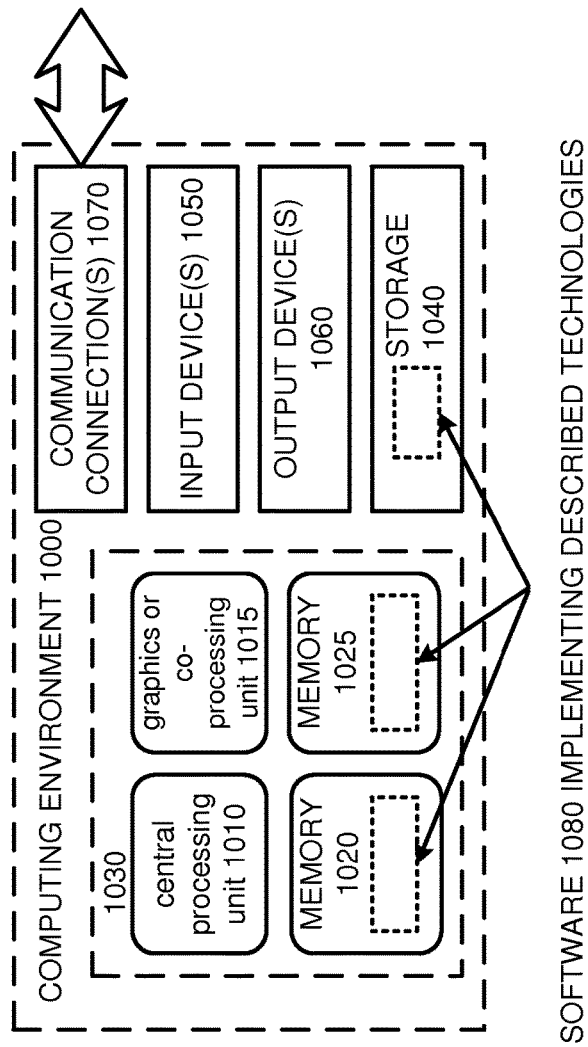
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of migrating applications from an enterprise-based network to a multi-tenant network of a compute service provider, the method comprising:
   receiving a request to migrate an application running on a first virtual machine instance within the enterprise-based network, wherein the request is received in a migration service of the compute service provider;
   determining dependencies of the application by identifying at least a second virtual machine instance within the enterprise-based network, wherein the at least second virtual machine instance is associated with the application;
   receiving resource monitoring metrics associated with hardware resources used by the first virtual machine instance and the at least second virtual machine instance, wherein the hardware resources are associated with at least one host server computer hosting the first virtual machine instance and the at least second virtual machine instance;
   selecting, based on the resource monitoring metrics, a virtual machine instance type from a plurality of available virtual machine instance types at the multi-tenant network of the compute service provider for each of, at least, the first virtual machine instance and the at least second virtual machine instance;
   migrating the first virtual machine instance and the at least second virtual machine instance from the enterprise-based network to each of the selected virtual machine instance types, wherein the selected virtual machine instance types are hosted by a server computer within the multi-tenant network of the compute service provider, thereby migrating the application from the enterprise-based network to the multi-tenant network of the compute service provider; and
   configuring a network topology within the multi-tenant network of the compute service provider in which a physical, hardware-based connection topology of the enterprise-based network is at least partially emulated on the multi-tenant network of the compute service provider by the server computer within the multi-tenant network of the compute service provider, wherein configuring the network topology is controlled through client input to the migration service of the compute service provider, and wherein at least a partial network configuration of the physical, hardware-based connection topology of the enterprise-based network is preserved upon migration of the application to the multi-tenant network of the compute service provider, including preserving an internet protocol address and a host name of an enterprise-based server or preserving a virtual machine server dependency of an enterprise-based network application.

2. The method according to claim 1, wherein the migrating comprises:
   migrating the first virtual machine instance from the enterprise-based network to at least a first virtual machine instance of the selected virtual machine instance type; and
   migrating the at least second virtual machine instance from the enterprise-based network to at least a second virtual machine instance of the selected virtual machine instance type,
   wherein the at least first and at least second virtual machine instances are hosted by the server computer within the multi-tenant network of the compute service provider.

3. The method according to claim 1, wherein the enterprise-based network comprises a private network and the method further comprises:
   determining whether the first virtual machine instance and the at least second virtual machine instance are in a single sub-network or in separate sub-networks of the private network.

4. The method according to claim 3, comprising:
   when the first virtual machine instance and the at least second virtual machine instance are in a single sub-network of the private network, creating a sub-network within the multi-tenant network of the compute service provider for at least one virtual machine instance running the migrated application; and
   when the first virtual machine instance and the at least second virtual machine instance are in separate sub-networks of the private network, creating at least a first sub-network and a second sub-network within the multi-tenant network of the compute service provider, wherein the first sub-network within the multi-tenant network of the compute service provider is for hosting at least a first virtual machine instance of the selected virtual machine instance type, and wherein the second sub-network within the multi-tenant network of the compute service provider is for hosting at least a second virtual machine instance of the selected virtual machine instance type.

5. The method according to claim 1, comprising:
   determining a name and an IP address for the at least one host server computer hosting the first virtual machine instance and the at least second virtual machine instance within the enterprise-based network.

6. The method according to claim 5, comprising:
   assigning a name and an IP address to the server computer within the multi-tenant network of the compute service provider, wherein the name and the IP address are the same as a name and an IP address associated with the at least one host server computer within the enterprise-based network.

7. A computer-readable storage medium storing instructions thereon for executing a method of migrating applications from an enterprise-based network to a multi-tenant network of a compute service provider, the method comprising:
- receiving a request to migrate at least one application running on a virtual machine instance hosted by a server computer within the enterprise-based network;
- obtaining dependency information from a migration service within the enterprise-based network, wherein the dependency information identifies one or more virtual machine instances associated with the at least one application, and wherein the one or more virtual machine instances are run within the enterprise-based network;
- receiving, at the multi-tenant network of the compute service provider, resource monitoring metrics associated with usage of computing resources by the at least one application running on the virtual machine instance hosted by the server computer within the enterprise-based network;
- selecting, based at least in part on the resource monitoring metrics, a virtual machine instance type from a plurality of available virtual machine instance types for a virtual machine instance hosted by a server computer within the multi-tenant network of the compute service provider;
- migrating the at least one application from the enterprise-based network to the virtual machine instance hosted by the server computer within the multi-tenant network of the compute service provider;
- based on client input to the compute service provider, configuring a network address for the virtual machine instance hosted by the server computer within the multi-tenant network of the compute service provider; and
- configuring a network topology within the multi-tenant network of the compute service provider in which a physical, hardware-based connection topology of the enterprise-based network is at least partially emulated on the multi-tenant network of the compute service provider by the server computer within the multi-tenant network of the compute service provider, wherein configuring the network topology is controlled through client input associated with the migration of the at least one application, and wherein at least a partial network configuration of the physical, hardware-based connection topology of the enterprise-based network is preserved upon migration of the at least one application to the multi-tenant network of the compute service provider, including preserving an internet protocol address and a host name of an enterprise-based server or preserving a virtual machine server dependency of an enterprise-based network application.

8. The computer-readable storage medium of claim 7, wherein the selecting includes matching the resource monitoring metrics to performance metrics associated with the server computer within the multi-tenant network of the compute service provider.

9. The computer-readable storage medium of claim 8, wherein:
- the resource monitoring metrics include actual use by the at least one application of a CPU, memory, and disk I/O within the enterprise-based network; and
- the performance metrics include CPU speed, memory capacity, and disk I/O speed of the server computer within the multi-tenant network of the compute service provider.

10. The computer-readable storage medium of claim 7, wherein the migrating the at least one application further includes:
- migrating the one or more virtual machine instances from the enterprise-based network to corresponding one or more virtual machine instances hosted by the server computer within the multi-tenant network of the compute service provider, wherein the migrating comprises converting the one or more virtual machine instances from a virtual machine instance format compatible with the enterprise-based network to a virtual machine instance format compatible with the multi-tenant network of the compute service provider and using at least one driver compatible with the multi-tenant network of the compute service provider.

11. The computer-readable storage medium of claim 7, wherein the selecting the virtual machine instance type from the plurality of available virtual machine instance types for the virtual machine instance hosted by the server computer within the multi-tenant network of the compute service provider takes place automatically and without user intervention.

12. The computer-readable storage medium of claim 7, further including:
- providing at least one recommendation for one or both of the virtual machine instance type and a server computer type for the server computer within the multi-tenant network of the compute service provider; and
- in response to the at least one recommendation, receiving a selection of the virtual machine instance type and the server computer type for the server computer within the multi-tenant network of the compute service provider.

13. The computer-readable storage medium of claim 7, further including:
- receiving the resource monitoring metrics in response to an API request for information from the multi-tenant network of the compute service provider.

14. The computer-readable storage medium of claim 13, further including:
- in response to the API request for information, receiving information identifying at least one private network associated with the computing resources used by the at least one application running on the virtual machine instance hosted by the server computer within the enterprise-based network, wherein the computing resources are identified by a host name and a host IP address at the enterprise-based network.

15. The computer-readable storage medium of claim 14, further including:
- creating a private network for the server computer within the multi-tenant network of the compute service provider; and
- assigning a name and an IP address for the server computer within the multi-tenant network of the compute service provider, which are the same as the host name and the host IP address of the computing resources at the enterprise-based network.

16. A system for migrating applications from an enterprise-based network to a multi-tenant network of a compute service provider, the system comprising:
- a plurality of host server computers coupled together to form the multi-tenant network of the compute service provider, wherein at least a portion of the plurality of host server computers executes a plurality of virtual machines associated with a customer account; and an application migration service operable to:
- in response to receiving a request for migrating an application hosted on a first virtual machine instance within the enterprise-based network, determine at least a second virtual machine instance hosting the application within the enterprise-based network;
- map usage of computing resources within the enterprise-based network by the application to performance metrics associated with computing resources within the multi-tenant network of the compute service provider;
- select within the multi-tenant network of the compute service provider and based at least in part on the mapping, a virtual machine instance type from a plurality of available virtual machine instance types for each of the first and second virtual machine instances;
- migrate the first and second virtual machine instances from the enterprise-based network to first and second virtual machine instances of the selected virtual machine instance types hosted by a server computer within the multi-tenant network of the compute service provider, thereby migrating the application from the enterprise-based network to the multi-tenant network; and
- configure a network topology within the multi-tenant network of the compute service provider in which a physical, hardware-based connection topology of the enterprise-based network is at least partially emulated on the multi-tenant network of the compute service provider by the server computer within the multi-tenant network of the compute service provider, wherein configuring the network topology is controlled through client input associated with the application migration service, and wherein at least a partial network configuration of the physical, hardware-based connection topology of the enterprise-based network is preserved upon migration of the application to the multi-tenant network of the compute service provider, including preserving an internet protocol address and a host name of an enterprise-based server or preserving a virtual machine server dependency of an enterprise-based network application.

17. The system according to claim 16, wherein the application migration service is operable to:
- migrate the at least second virtual machine instance from the enterprise-based network to the at least second virtual machine instance of the selected virtual machine instance types.

18. The system according to claim 16, wherein the application migration service is operable to:
- receive at the multi-tenant network of the compute service provider, resource monitoring metrics indicative of the usage of computing resources by the application within the enterprise-based network.

19. The system according to claim 16, wherein the application migration service is operable to:
- in response to an API request, receive information indicative of a private sub-network associated with at least one server computer hosting the first virtual machine instance and the at least second virtual machine instance within the enterprise-based network;
- create a virtual private network at the multi-tenant network of the compute service provider; and
- launch a private sub-network for the server computer within the virtual private network.

* * * * *